United States Patent
Kwak et al.

(10) Patent No.: US 12,192,779 B2
(45) Date of Patent: Jan. 7, 2025

(54) FAST PRIMARY CELL SWITCHING IN CARRIER AGGREGATION

(71) Applicant: QUALCOMM Incorporated, San Diego, CA (US)

(72) Inventors: Yongjun Kwak, San Diego, CA (US); Hung Dinh Ly, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/539,046

(22) Filed: Nov. 30, 2021

(65) Prior Publication Data

US 2023/0171605 A1  Jun. 1, 2023

(51) Int. Cl.
*H04W 16/14* (2009.01)
*H04L 1/1867* (2023.01)
*H04W 16/24* (2009.01)

(52) U.S. Cl.
CPC .......... *H04W 16/14* (2013.01); *H04L 1/1893* (2013.01); *H04W 16/24* (2013.01)

(58) Field of Classification Search
CPC . H04W 16/14; H04W 16/24; H04W 36/0069; H04W 76/15; H04L 1/1893; H04L 1/1671
See application file for complete search history.

(56) References Cited

U.S. PATENT DOCUMENTS

| | | | |
|---|---|---|---|
| 2012/0044812 A1* | 2/2012 | Hiddink | H04W 72/21 370/330 |
| 2016/0112918 A1* | 4/2016 | Wen | H04W 36/0069 455/442 |
| 2019/0053183 A1* | 2/2019 | Park | H04W 74/004 |
| 2019/0098607 A1* | 3/2019 | Zhang | H04L 5/0098 |
| 2021/0250833 A1* | 8/2021 | Ioffe | H04W 36/06 |
| 2022/0061066 A1* | 2/2022 | Zhou | H04W 80/02 |

FOREIGN PATENT DOCUMENTS

WO  WO-2020164177 A1 *  8/2020  ............. H04L 5/001

\* cited by examiner

*Primary Examiner* — Ivan O Latorre
(74) *Attorney, Agent, or Firm* — Guang Y. Zhang; Holland & Hart LLP

(57) ABSTRACT

Methods, systems, and devices for wireless communications are described. The method includes establishing a first component carrier as a primary cell for the user equipment (UE) and a second component carrier as a secondary cell for the UE, receiving primary cell configuration information for the second component carrier while the second component carrier is the secondary cell for the UE, receiving a control message triggering a switch of the primary cell from the first component carrier to the second component carrier, and establishing the second component carrier as the primary cell for the UE based on the control message and in accordance with the primary cell configuration information associated with the second component carrier.

30 Claims, 16 Drawing Sheets

FAST PRIMARY CELL SWITCHING IN CARRIER AGGREGATION

FIELD OF TECHNOLOGY

The following relates to wireless communications, including fast primary cell switching in carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support carrier aggregation, in which a UE uses multiple component carriers or cells to communicate with a network. In some cases, it may be desirable to improve the wireless communications associated with carrier aggregation scenarios at a UE.

SUMMARY

The described techniques relate to improved methods, systems, devices, and apparatuses that support fast primary cell switching in carrier aggregation. According to these techniques, a UE may receive primary cell configuration information for a component carrier while the component carrier is a secondary cell for the UE. The UE may use the primary cell configuration information to switch the component carrier to a primary cell relatively quickly in response to a trigger.

A method is described. The method may include establishing a first component carrier as a primary cell for the user equipment (UE) and a second component carrier as a secondary cell for the UE, receiving primary cell configuration information for the second component carrier while the second component carrier is the secondary cell for the UE, receiving a control message triggering a switch of the primary cell from the first component carrier to the second component carrier, and establishing the second component carrier as the primary cell for the UE based on the control message and in accordance with the primary cell configuration information associated with the second component carrier.

An apparatus is described. The apparatus may include a processor, memory coupled with the processor, and instructions stored in the memory. The instructions may be executable by the processor to cause the apparatus to establish a first component carrier as a primary cell for the UE and a second component carrier as a secondary cell for the UE, receive primary cell configuration information for the second component carrier while the second component carrier is the secondary cell for the UE, receive a control message triggering a switch of the primary cell from the first component carrier to the second component carrier, and establish the second component carrier as the primary cell for the UE based on the control message and in accordance with the primary cell configuration information associated with the second component carrier.

Another apparatus is described. The apparatus may include means for establishing a first component carrier as a primary cell for the UE and a second component carrier as a secondary cell for the UE, means for receiving primary cell configuration information for the second component carrier while the second component carrier is the secondary cell for the UE, means for receiving a control message triggering a switch of the primary cell from the first component carrier to the second component carrier, and means for establishing the second component carrier as the primary cell for the UE based on the control message and in accordance with the primary cell configuration information associated with the second component carrier.

A non-transitory computer-readable medium storing code is described. The code may include instructions executable by a processor to establish a first component carrier as a primary cell for the UE and a second component carrier as a secondary cell for the UE, receive primary cell configuration information for the second component carrier while the second component carrier is the secondary cell for the UE, receive a control message triggering a switch of the primary cell from the first component carrier to the second component carrier, and establish the second component carrier as the primary cell for the UE based on the control message and in accordance with the primary cell configuration information associated with the second component carrier.

Some examples of the method, apparatuses, and non-transitory computer-readable medium described herein may further include operations, features, means, or instructions for receiving the primary cell configuration information after receiving a previous primary cell configuration information for a set of one or more secondary cells associated with the second component carrier and in connection with the secondary cell being added to the set of one or more secondary cells prior to receiving the control message.

Some examples of the method, apparatuses, and non-transitory computer-readable medium described herein may further include operations, features, means, or instructions for receiving an update to the primary cell configuration information prior to receiving the control message and incorporating the update into the primary cell configuration information prior to establishing the second component carrier as the primary cell for the UE.

Some examples of the method, apparatuses, and non-transitory computer-readable medium described herein may further include operations, features, means, or instructions for using at least a portion of a configuration associated with the first component carrier as the primary cell with the second component carrier established as the primary cell.

Some examples of the method, apparatuses, and non-transitory computer-readable medium described herein may further include operations, features, means, or instructions for determining, before receiving the control message, that the primary cell configuration information does not include at least a portion of a configuration for configuring the second component carrier as the primary cell and using at least a portion of a configuration associated with the first component carrier as the primary cell to generate or modify the configuration for the second component carrier as the primary cell.

In some examples of the method, apparatuses, and non-transitory computer-readable medium described herein, the primary cell configuration information includes a first primary cell configuration of a first secondary cell of the second component carrier and a second primary cell configuration of a second secondary cell of the second component carrier.

In some examples of the method, apparatuses, and non-transitory computer-readable medium described herein, the primary cell configuration information includes a physical uplink control channel configuration for primary cells, a random access channel configuration for primary cells, a measurement configuration for primary cells, a radio link failure configuration for primary cells, or a radio link monitoring configuration for primary cells, or a combination thereof.

In some examples of the method, apparatuses, and non-transitory computer-readable medium described herein, the control message specifies the primary cell configuration information to be used with the second component carrier when the second component carrier may be established as the primary cell.

In some examples of the method, apparatuses, and non-transitory computer-readable medium described herein, and the method, apparatuses, and non-transitory computer-readable medium may include further operations, features, means, or instructions for that the second component carrier may be selected to be established as the primary cell, that the first component carrier may be selected to be established as the secondary cell, or whether the first component carrier may be selected for deactivation, or any combination thereof.

In some examples of the method, apparatuses, and non-transitory computer-readable medium described herein, the control message includes an indicator indicating whether the first component carrier may be selected for deactivation.

In some examples of the method, apparatuses, and non-transitory computer-readable medium described herein, and the method, apparatuses, and non-transitory computer-readable medium may include further operations, features, means, or instructions for that the second component carrier may be selected to be established as the primary cell, that the first component carrier may be selected to be established as the secondary cell, or whether the first component carrier may be selected for deactivation, or any combination thereof.

In some examples of the method, apparatuses, and non-transitory computer-readable medium described herein, and the method, apparatuses, and non-transitory computer-readable medium may include further operations, features, means, or instructions for that the second component carrier may be selected to be established as the primary cell, that the first component carrier may be selected to be established as the secondary cell, or whether the first component carrier may be selected for deactivation, or any combination thereof.

Some examples of the method, apparatuses, and non-transitory computer-readable medium described herein may further include operations, features, means, or instructions for transmitting a completion message based on establishing the second component carrier as the primary cell, where the completion message may be transmitted via the second component carrier as the primary cell or the first component carrier as the secondary cell.

In some examples of the method, apparatuses, and non-transitory computer-readable medium described herein, the completion message may be transmitted in a dedicated field of uplink control information via a physical uplink control channel or a physical uplink shared channel.

In some examples of the method, apparatuses, and non-transitory computer-readable medium described herein, the completion message may be transmitted via a hybrid automatic repeat request acknowledgment.

In some examples of the method, apparatuses, and non-transitory computer-readable medium described herein, the fast primary cell switching may be based on the first component carrier and the second component carrier being in a same timing advance group.

In some examples of the method, apparatuses, and non-transitory computer-readable medium described herein, the fast primary cell switching may be based on the first component carrier and the second component carrier being associated with a same base station.

Some examples of the method, apparatuses, and non-transitory computer-readable medium described herein may further include operations, features, means, or instructions for receiving a second control message triggering a switch of the primary cell from the second component carrier back to the first component carrier and reestablishing the first component carrier as the primary cell for the UE and the second component carrier as the secondary cell for the UE based on the second control message.

In some examples of the method, apparatuses, and non-transitory computer-readable medium described herein, where the control message may be received based on a first network condition or the second control message may be received based on a second network condition, or both and where the first network condition or the second network condition is, or both are, based on a network load associated with the first component carrier or a network load associated with the second component carrier, or a network load associated with the first component carrier and the second component carrier.

A method is described. The method may include establishing a first component carrier as a primary cell for a UE and a second component carrier as a secondary cell for the UE, transmitting, to the UE, primary cell configuration information for the second component carrier while the second component carrier is the secondary cell for the UE, transmitting, to the UE, a control message triggering a switch of the primary cell from the first component carrier to the second component carrier, and establishing the second component carrier as the primary cell for the UE based on the control message and in accordance with the primary cell configuration information associated with the second component carrier.

An apparatus is described. The apparatus may include a processor, memory coupled with the processor, and instructions stored in the memory. The instructions may be executable by the processor to cause the apparatus to establish a first component carrier as a primary cell for a UE and a second component carrier as a secondary cell for the UE, transmit, to the UE, primary cell configuration information for the second component carrier while the second component carrier is the secondary cell for the UE, transmit, to the UE, a control message triggering a switch of the primary cell from the first component carrier to the second component carrier, and establish the second component carrier as the primary cell for the UE based on the control message and in accordance with the primary cell configuration information associated with the second component carrier.

Another apparatus is described. The apparatus may include means for establishing a first component carrier as a primary cell for a UE and a second component carrier as a secondary cell for the UE, means for transmitting, to the UE, primary cell configuration information for the second component carrier while the second component carrier is the secondary cell for the UE, means for transmitting, to the UE, a control message triggering a switch of the primary cell from the first component carrier to the second component carrier, and means for establishing the second component carrier as the primary cell for the UE based on the control message and in accordance with the primary cell configuration information associated with the second component carrier.

A non-transitory computer-readable medium storing code is described. The code may include instructions executable by a processor to establish a first component carrier as a primary cell for a UE and a second component carrier as a secondary cell for the UE, transmit, to the UE, primary cell configuration information for the second component carrier while the second component carrier is the secondary cell for the UE, transmit, to the UE, a control message triggering a switch of the primary cell from the first component carrier to the second component carrier, and establish the second component carrier as the primary cell for the UE based on the control message and in accordance with the primary cell configuration information associated with the second component carrier.

Some examples of the method, apparatuses, and non-transitory computer-readable medium described herein may further include operations, features, means, or instructions for transmitting the primary cell configuration information after transmitting a previous primary cell configuration information for a set of one or more secondary cells associated with the second component carrier and in connection with the secondary cell being added to the set of one or more secondary cells prior to receiving the control message.

Some examples of the method, apparatuses, and non-transitory computer-readable medium described herein may further include operations, features, means, or instructions for transmitting an update to the primary cell configuration information prior to receiving the control message.

In some examples of the method, apparatuses, and non-transitory computer-readable medium described herein, the primary cell configuration information includes a first primary cell configuration of a first secondary cell of the second component carrier and a second primary cell configuration of a second secondary cell of the second component carrier.

In some examples of the method, apparatuses, and non-transitory computer-readable medium described herein, the primary cell configuration information includes a physical uplink control channel configuration for primary cells, a random access channel configuration for primary cells, a measurement configuration for primary cells, a radio link failure configuration for primary cells, or a radio link monitoring configuration for primary cells, or a combination thereof.

In some examples of the method, apparatuses, and non-transitory computer-readable medium described herein, the control message specifies the primary cell configuration information to be used with the second component carrier when the second component carrier may be established as the primary cell.

In some examples of the method, apparatuses, and non-transitory computer-readable medium described herein, and the method, apparatuses, and non-transitory computer-readable medium may include further operations, features, means, or instructions for that the second component carrier may be selected to be established as the primary cell, that the first component carrier may be selected to be established as the secondary cell, or whether the first component carrier may be selected for deactivation, or any combination thereof.

In some examples of the method, apparatuses, and non-transitory computer-readable medium described herein, the control message includes an indicator indicating whether the first component carrier may be selected for deactivation.

In some examples of the method, apparatuses, and non-transitory computer-readable medium described herein, and the method, apparatuses, and non-transitory computer-readable medium may include further operations, features, means, or instructions for that the second component carrier may be selected to be established as the primary cell, that the first component carrier may be selected to be established as the secondary cell, or whether the first component carrier may be selected for deactivation, or any combination thereof.

In some examples of the method, apparatuses, and non-transitory computer-readable medium described herein, and the method, apparatuses, and non-transitory computer-readable medium may include further operations, features, means, or instructions for that the second component carrier may be selected to be established as the primary cell, that the first component carrier may be selected to be established as the secondary cell, or whether the first component carrier may be selected for deactivation, or any combination thereof.

Some examples of the method, apparatuses, and non-transitory computer-readable medium described herein may further include operations, features, means, or instructions for receiving a completion message based on establishing the second component carrier as the primary cell, where the completion message may be received via the second component carrier as the primary cell or the first component carrier as the secondary cell.

In some examples of the method, apparatuses, and non-transitory computer-readable medium described herein, the completion message may be received in a dedicated field of uplink control information via a physical uplink control channel or a physical uplink shared channel.

In some examples of the method, apparatuses, and non-transitory computer-readable medium described herein, the completion message may be received via a hybrid automatic repeat request acknowledgment.

In some examples of the method, apparatuses, and non-transitory computer-readable medium described herein, the fast primary cell switching may be based on the first component carrier and the second component carrier being in a same timing advance group.

In some examples of the method, apparatuses, and non-transitory computer-readable medium described herein, the fast primary cell switching may be based on the first component carrier and the second component carrier being associated with the base station.

Some examples of the method, apparatuses, and non-transitory computer-readable medium described herein may further include operations, features, means, or instructions for maintaining, based on the control message, a second primary cell on the second component carrier and a second secondary cell on the first component carrier, the primary cell and the secondary cell associated with a first group of UEs including the UE, and the second primary cell and second secondary cell associated with a second group of UEs different from the first group of UEs.

Some examples of the method, apparatuses, and non-transitory computer-readable medium described herein may further include operations, features, means, or instructions for deactivating the first component carrier based on the control message.

Some examples of the method, apparatuses, and non-transitory computer-readable medium described herein may further include operations, features, means, or instructions for transmitting, to the UE, a second control message triggering a switch of the primary cell from the second component carrier back to the first component carrier and reestablishing the first component carrier as the primary cell for the UE and the second component carrier as the secondary cell for the UE based on the second control message.

In some examples of the method, apparatuses, and non-transitory computer-readable medium described herein, where the control message may be transmitted based on a first network condition or the second control message may be transmitted based on a second network condition, or both and where the first network condition or the second network condition is, or both are, based on a network load associated with the first component carrier or a network load associated with the second component carrier, or a network load associated with the first component carrier and the second component carrier.

DETAILED DESCRIPTION

Figure 1:
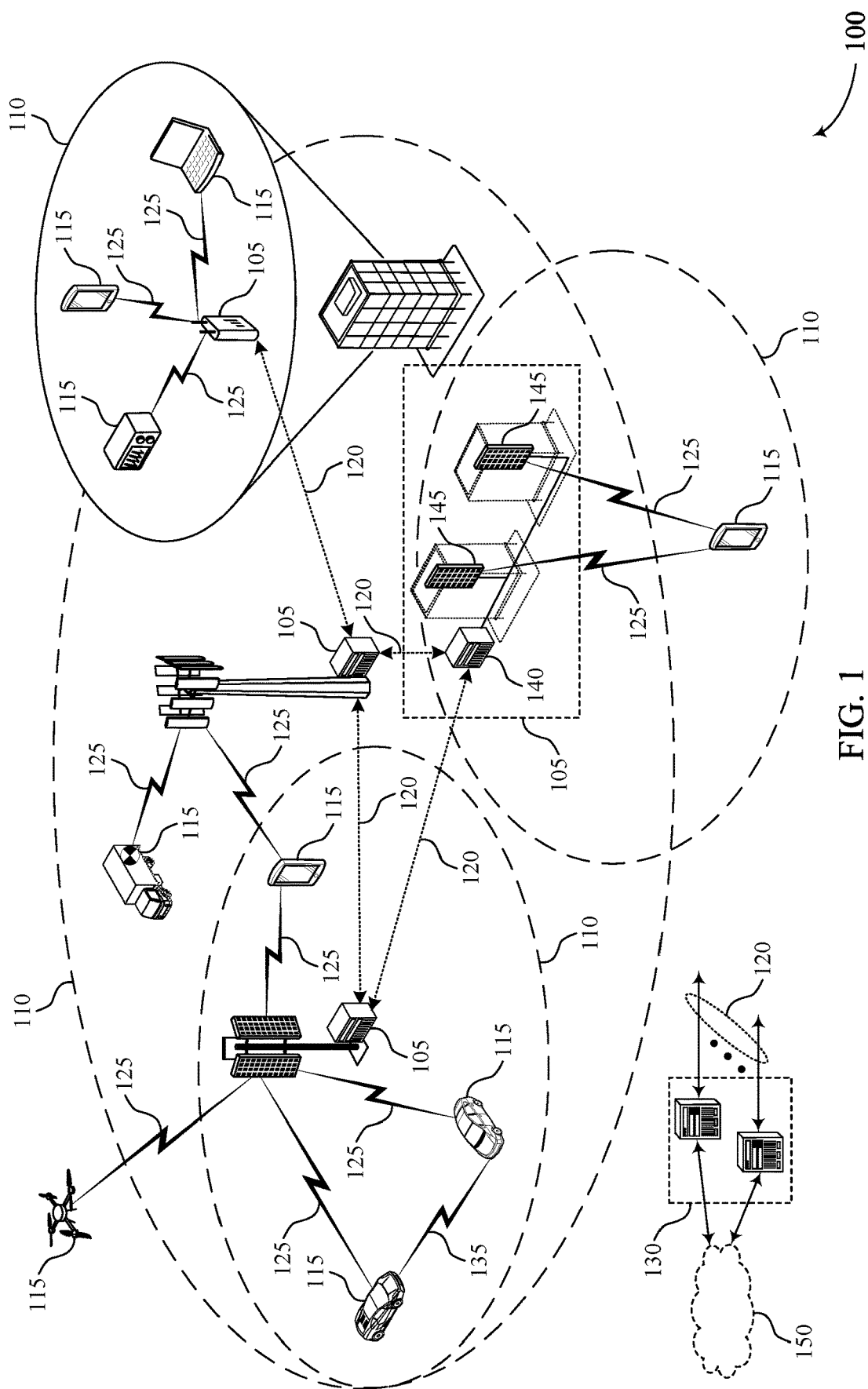
FIG. 1 illustrates an example of a wireless communications system that supports fast primary cell switching in carrier aggregation in accordance with aspects of the present disclosure.

The present techniques include fast primary cell switching in carrier aggregation. In some cases, primary cells may be different between different UEs (e.g., a first primary cell for a first group of UEs on a first component carrier (CC1), a second primary cell for a second group of UEs on CC2, etc.). However, when traffic drops off, a single component carrier (e.g., CC1 or CC2) may be sufficient to handle traffic for both groups of UEs. Some wireless systems may use a handover procedure that includes radio resource control (RRC) reconfiguration and a random access procedure in order to switch to a common component carrier. However, such handover procedures are relatively time-consuming, resulting in decreased quality of service and a reduced user experience.

The present techniques provide systems and methods to that enable switching a component carrier from a secondary cell to a primary cell without the overhead of performing a full RRC reconfiguration or a random access procedure at the time of the switch.

In some cases, a network using different component carriers as primary cells for different UEs may experience a drop off in traffic and use these fast switching techniques to consolidate UEs (e.g., all of the UEs) onto a single component carrier as the primary cell or primary cells in a relatively short period of time. The present techniques may also enable deactivating the components carriers of respective secondary cells that are not needed based on the drop off in traffic and in connection with the primary cell consolidation.

For example, a wireless communications system may include a first group of UEs configured with a primary cell (e.g., primary cell-1) on a first component carrier (CC1) and one or more secondary cells (e.g., secondary cell-1) on a second component carrier (CC2), while a second group of UEs may be configured with a primary cell-2 on CC2, and secondary cell-2 on CC1. When the wireless communications system determines associated traffic drops below some level, the wireless communications system may perform one or more operations to maintain CC1 and deactivate CC2. Those operations may include switching secondary cell-2 to a target primary cell (e.g., primary cell-1 and target primary cell on CC1), and switching primary cell-2 to a target secondary cell (e.g., secondary cell-1 and target secondary cell on CC2). In some cases, the operations may include deactivating CC2, thus deactivating secondary cell-1 and target secondary cell. However, to avoid the relatively time-consuming handover procedures involving RRC reconfiguration and random access procedures, the wireless communications system may pre-configure a UE (e.g., a group of UEs) with a primary cell configuration for a secondary cell (e.g., a primary cell configuration for secondary cell-2). Thus, when the wireless communications system switches secondary cell-2 to a target primary cell, the UE or group of UEs are pre-configured to communicate with secondary cell-2 configured as a primary cell. In some cases, switching the component carriers may be allowed between cells inside a same base station (e.g., intra-gNodeB handover, a UE switching a primary cell from one distributed unit to another distributed unit within the same centralized unit). It is noted that a "primary cell" may be referred to as a PCell. In some cases, a "secondary cell" may be referred to as a SCell.

Aspects of the subject matter described herein may be implemented to realize one or more advantages. The described techniques may support improvements in system efficiency such that a device may perform a primary cell switching procedure that is relatively faster than RRC reconfiguration and random access procedures of other systems. The described techniques may result in improving system and power efficiency, decreasing battery usage, decreasing system latency, and improving or maintaining user experience.

Aspects of the disclosure are initially described in the context of wireless communications systems. Aspects of the disclosure are further illustrated by and described with reference to block diagrams and process flows that relate to fast primary cell switching in carrier aggregation. Aspects of the disclosure are further illustrated by and described with reference to apparatus diagrams, system diagrams, and flowcharts that relate to fast primary cell switching in carrier aggregation.

FIG. 1 illustrates an example of a wireless communications system 100 that supports fast primary cell switching in carrier aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may establish a first component carrier as a primary cell for the UE 115 and a second component carrier as a secondary cell for the UE 115. In some cases, the UE 115 may receive primary cell configuration information for the second component carrier while the second component carrier is the secondary cell for the UE 115. In some cases, the UE 115 may receive a control message triggering a switch of the primary cell from the first component carrier to the second component carrier. In some cases, the UE 115 may establish the second component carrier as the primary cell for the UE 115 based on the second control message and in accordance with the primary cell configuration information associated with the second component carrier.

Figure 2:
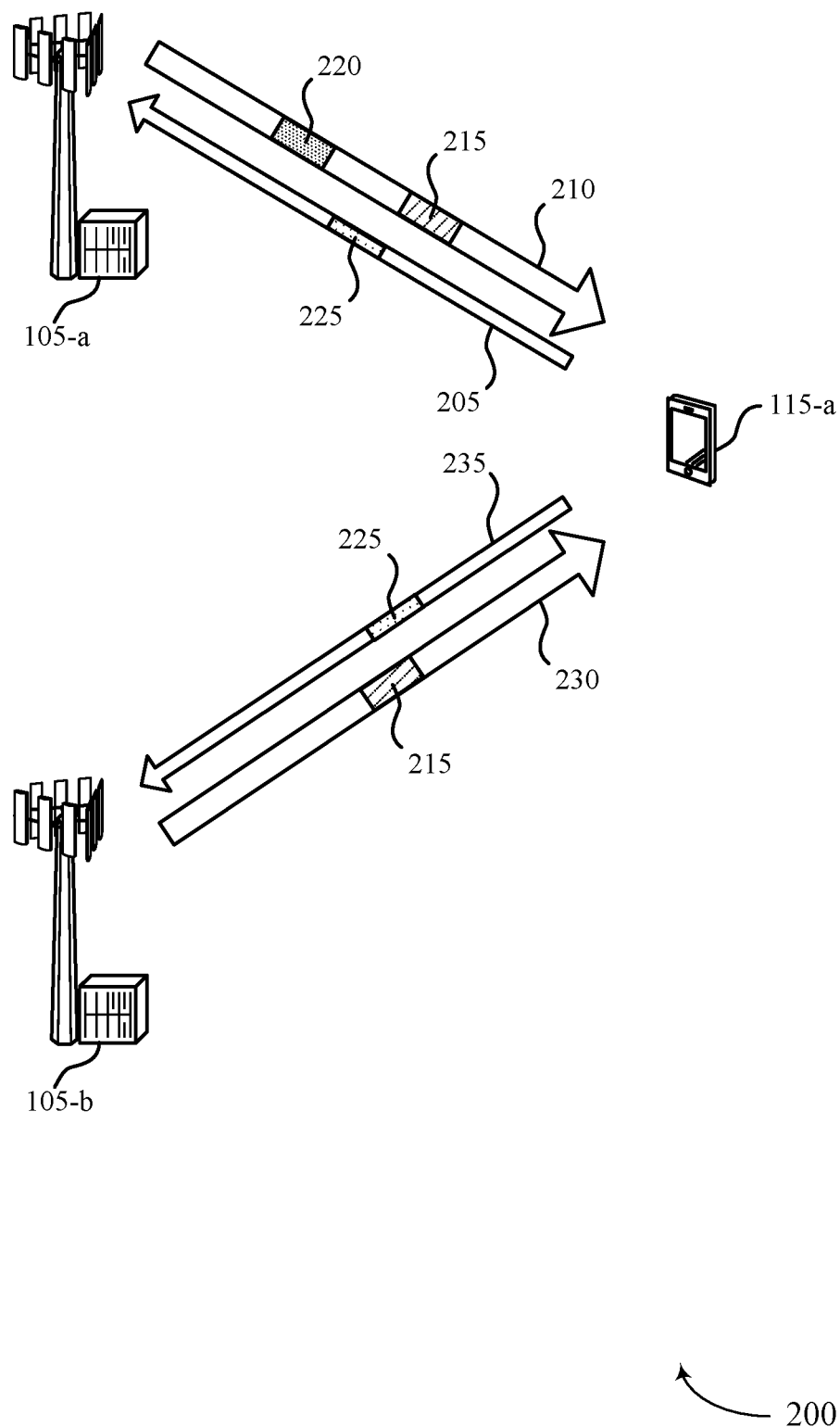
FIG. 2 illustrates an example of a wireless communications system that supports fast primary cell switching in carrier aggregation in accordance with aspects of the present disclosure.

FIG. 2 illustrates an example of a wireless communications system 200 that supports fast primary cell switching in carrier aggregation in accordance with aspects of the present disclosure. In some examples, some aspects of wireless communications system 200 may implement or be implemented by aspects of wireless communications system 100. For example, wireless communications system 200 may include a base station 105-a, base station 105-b, and at least a UE 115-a, which may be examples, respectively, of a base station 105 and a UE 115 described with reference to FIG. 1. In some cases, UE 115-a may represent one UE of a first group of UEs associated with base station 105-a or base station 105-b, or both. In some cases, a second group of one or more UEs may be associated with base station 105-a or base station 105-b, or both.

In some examples, base station 105-a and base station 105-b may be configured as standalone base stations or non-standalone base stations. In some cases, base station 105-a and base station 105-b may optionally be configured as distributed unit base stations of a centralized unit base station. In some cases, base station 105-a and base station 105-b may be physically separate base stations. Although reference is made to operations in relation to base station 105-a or base station 105-b, or both, the described operations may be performed in relation to a single base station (e.g., base station 105-a or base station 105-b), or multiple base stations (e.g., any combination of base station 105-a and base station 105-b).

As illustrated, wireless communications system 200 may include downlink 205 and uplink 210 between base station 105-a and UE 115-a. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210. In the illustrated example, wireless communications system 200 may optionally also include downlink 230 and uplink 235 between base station 105-b and UE 115-a. Base station 105-b may use downlink 230 to convey control and/or data information to UE 115-a. And UE 115-a may use uplink 235 to convey control and/or data information to base station 105-b. In some cases, downlink 230 may use different time and/or frequency resources than uplink 235.

In some examples, UE 115-a may establish a first component carrier as a primary cell of UE 115-a and a second component carrier as a secondary cell of UE 115-a. In some cases, a second group of one or more UEs may establish the first component carrier as a secondary cell and the second component carrier as a primary cell. In the illustrated example, the first component carrier may be associated with base station 105-*a* (e.g., first distributed unit) and the second component carrier may be associated with base station 105-*b* (e.g., second distributed unit).

In some examples, UE 115-*a* may receive primary cell configuration information 215 associated with the second component carrier (e.g., base station 105-*b*) while the second component carrier is the secondary cell for UE 115-*a* (e.g., while the second component carrier is a primary cell for the second group of UEs). In some cases, UE 115-*a* may receive the primary cell configuration information 215 from base station 105-*a*. In some cases, UE 115-*a* may receive the primary cell configuration information 215 from base station 105-*b*. In some cases, UE 115-*a* may receive the primary cell configuration information 215 from base station 105-*a* and from base station 105-*b*.

In some examples, UE 115-*a* may receive a control message 220. In some cases, the control message 220 may trigger a switch of the primary cell from the first component carrier (e.g., base station 105-*a*) to the second component carrier (e.g., base station 105-*b*).

In some examples, UE 115-*a* may establish the second component carrier as the primary cell for UE 115-*a* based on the control message and in accordance with the primary cell configuration information associated with the second component carrier. In some cases, the switching of the primary cell to the second component carrier may be based on the first component carrier and the second component carrier being in a same timing advance group. In some cases, the cells or component carriers being in the same timing advance group may include each cell or component carrier having the same uplink transmission timing (e.g., based on a timing advance of the primary cell). In some cases, the cells or component carriers being in the same timing advance group may include each cell or component carrier being in the same tracking area (e.g., the same tracking area group), where each cell or component carrier has (e.g., is assigned or uses) the same tracking area identity (TAI). In some cases, the switching of the primary cell to the second component carrier may be based on the first component carrier and the second component carrier (e.g., base station 105-*a* and base station 105-*b*) being associated with a same base station (e.g., base station 105-*a* or base station 105-*b*).

In some examples, UE 115-*a* may transmit a completion message 225 based on establishing the second component carrier as the primary cell. In some cases, UE 115-*a* may transmit the completion message 225 to base station 105-*a* or to base station 105-*b*, or to both. In some cases, the completion message may be transmitted via the second component carrier configured as the primary cell or the first component carrier configured as the secondary cell. In some cases, the completion message may be transmitted in a dedicated field of uplink control information via a physical uplink control channel or a physical uplink shared channel. In some cases, the completion message may be transmitted via a hybrid automatic repeat request acknowledgment.

The present techniques may increase the efficiency of wireless communications system 200 such that a device may perform a primary cell switching procedure that is relatively faster than switching based on the RRC reconfiguration and random access procedures of other systems. The described techniques may result in improving system and power efficiency, decreasing battery usage, decreasing system latency, thus improving user experience of the one or more devices with longer battery life and improved quality of service.

Figure 3:
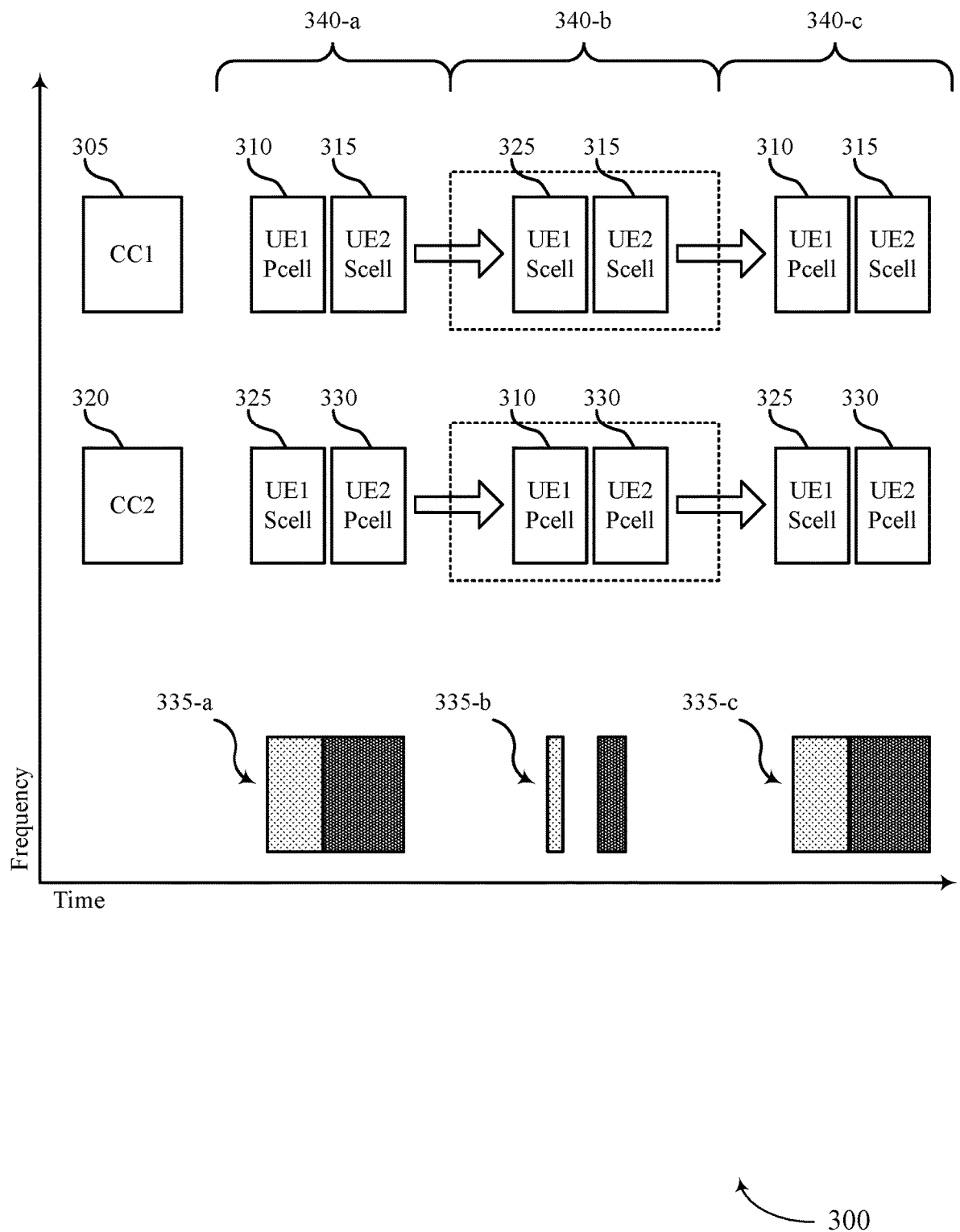
FIG. 3 illustrates an example of a set of component carriers that supports fast primary cell switching in carrier aggregation in accordance with aspects of the present disclosure.

FIG. 3 illustrates an example of a set of component carriers 300 that supports fast primary cell switching in carrier aggregation in accordance with aspects of the present disclosure. In some examples, some aspects of the set of component carriers 300 may implement or be implemented by aspects of wireless communications system 100. For example, the set of component carriers 300 may be associated with one or more base stations and one or more UEs, which may be examples of a base station 105 or UE 115 described with reference to FIG. 1.

In the illustrated example, the set of component carriers 300 may include first component carrier 305 and second component carrier 320. As shown, first component carrier 305 may be associated with a first frequency range and second component carrier 320 may be associated with a second frequency range. In some cases, first component carrier 305 and second component carrier 320 may be configured as intra-band contiguous, intra-band non-contiguous, or inter-band, or a combination thereof.

In the illustrated example, at a first time period 340-*a*, first component carrier 305 and second component carrier 320 may be associated with traffic 335-*a*. In some cases, at first time period 340-*a*, a base station or UE, or both, may determine that traffic 335-*a* is at a relatively high volume of data traffic (e.g., is at or above a traffic threshold). Accordingly, the base station may keep first component carrier 305 and second component carrier 320 activated to handle traffic 335-*a*.

As shown, first component carrier 305, at first time period 340-*a*, may be associated with a primary cell 310 of a first group of UEs (e.g., first group of one or more UEs) and a secondary cell 315 of a second group of UEs (e.g., second group of one or more UEs). In some examples, the base station and the first group of UEs may establish the first component carrier 305 as the primary cell for the first group of UEs and the second component carrier 320 as the secondary cell for the first group of UEs.

As shown, second component carrier 320, at first time period 340-*a*, may be associated with a secondary cell 325 of the first group of UEs and a primary cell 330 of the second group of UEs. In some examples, the base station and the second group of UEs may establish the second component carrier 320 as the primary cell for the second group of UEs and the first component carrier 305 as the secondary cell for the second group of UEs.

In some examples, the base station may transmit, to at least the first group of UEs (e.g., broadcast to the first group of UEs and the second group of UEs), primary cell configuration information for the second component carrier 320 while the second component carrier 320 is the secondary cell for the first group of UEs (e.g., during first time period 340-*a*).

In the illustrated example, at a second time period 340-*b*, first component carrier 305 and second component carrier 320 may be associated with traffic 335-*b*. In some cases, at second time period 340-*b*, a base station or UE, or both, may determine that traffic 335-*b* is at a relatively low volume of data traffic (e.g., drops below a traffic threshold). Accordingly, the base station may perform one or more procedures to deactivate the second component carrier 320 and keep the first component carrier 305 in an active state to handle traffic 335-*b*.

In some examples, the base station may transmit, to at least the first group of UEs (e.g., broadcast to the first group of UEs and the second group of UEs), a control message triggering a switch of the primary cell of the first group of UEs from the first component carrier 305 to the second component carrier 320 (e.g., based on the relatively low volume of traffic 335-*b*). In some cases, the base station may transmit the control message during the second time period 340-*b*. In some cases, the control message may specify a configuration of the primary cell configuration information for the first group of UEs to use with the second component carrier 320 when the second component carrier 320 is established as the primary cell of the first group of UEs.

In some examples, the base station, during the second time period 340-*b*, may establish the second component carrier 320 as the primary cell of the first group of UEs based on the control message and in accordance with the primary cell configuration selected for the second component carrier 320. In some cases, the base station, during the second time period 340-*b*, may establish the first component carrier 305 as the secondary cell for the first group of UEs based on the control message.

In some examples, based on the control message, the first group of UEs may use at least a portion of a configuration associated with the first component carrier 305 as the primary cell with the second component carrier 320 established as the primary cell. In some cases, the first group of UEs may determine that the primary cell configuration information does not include at least a portion of a configuration for configuring the second component carrier 320 as the primary cell.

In some cases, the first group of UEs may determine that the primary cell configuration information does not include at least a portion of a configuration for configuring the second component carrier 320 as the primary cell before receiving the control message (e.g., during first time period 340-*a* or during the second time period 340-*b* before receiving the control message). In some cases, the first group of UEs may determine that the primary cell configuration information does not include at least a portion of a configuration for configuring the second component carrier 320 after receiving the control message. When the first group of UEs determines that the primary cell configuration information does not include at least a portion of a configuration for configuring the second component carrier 320 as the primary cell, the first group of UEs may use at least a portion of a configuration associated with the first component carrier 305 as the primary cell to generate or modify the configuration for the second component carrier 320 as the primary cell.

As shown, based on the switching of the cells of the first group of UEs, the first component carrier 305, may be associated with secondary cell 325 of the first group of UEs and the secondary cell 315 of the second group of UEs during the second time period 340-*b*. As shown, during the second time period 340-*b* second component carrier 320 may be associated with the primary cell 310 of the first group of UEs and the primary cell 330 of the second group of UEs based on the switching of the cells of the first group of UEs.

In the illustrated example, at a third time period 340-*c*, first component carrier 305 and second component carrier 320 may be associated with traffic 335-*c*. In some cases, at third time period 340-*c* a base station or UE, or both, may determine that traffic 335-*c* is at a relatively high volume of data traffic (e.g., has returned to a relatively high volume of data traffic, is at or above a traffic threshold, has risen above the traffic threshold, etc.). Accordingly, the base station may maintain the first component carrier 305 in an active state and perform one or more procedures to reactivate the second component carrier 320 to handle traffic 335-*c* together with the first component carrier 305.

In some examples, during the third time period 340-*c* the base station may transmit, to at least the first group of UEs (e.g., broadcast to the first group of UEs and the second group of UEs), a second control message triggering a switch of the primary cell 310 of the first group of UEs from the second component carrier 320 back to the first component carrier 305. In some cases, the base station may reestablish the first component carrier 305 as the primary cell 310 for the first group of UEs and the second component carrier 320 as the secondary cell 325 for the first group of UEs based on the second control message.

As shown, based on the second control message, during third time period 340-*c* the first component carrier 305 may be associated with primary cell 310 of the first group of UEs and the secondary cell 315 of second group of UEs, and the second component carrier 320, may be associated with the secondary cell 325 of the first group of UEs and the primary cell 330 of the second group of UEs.

Figure 4:
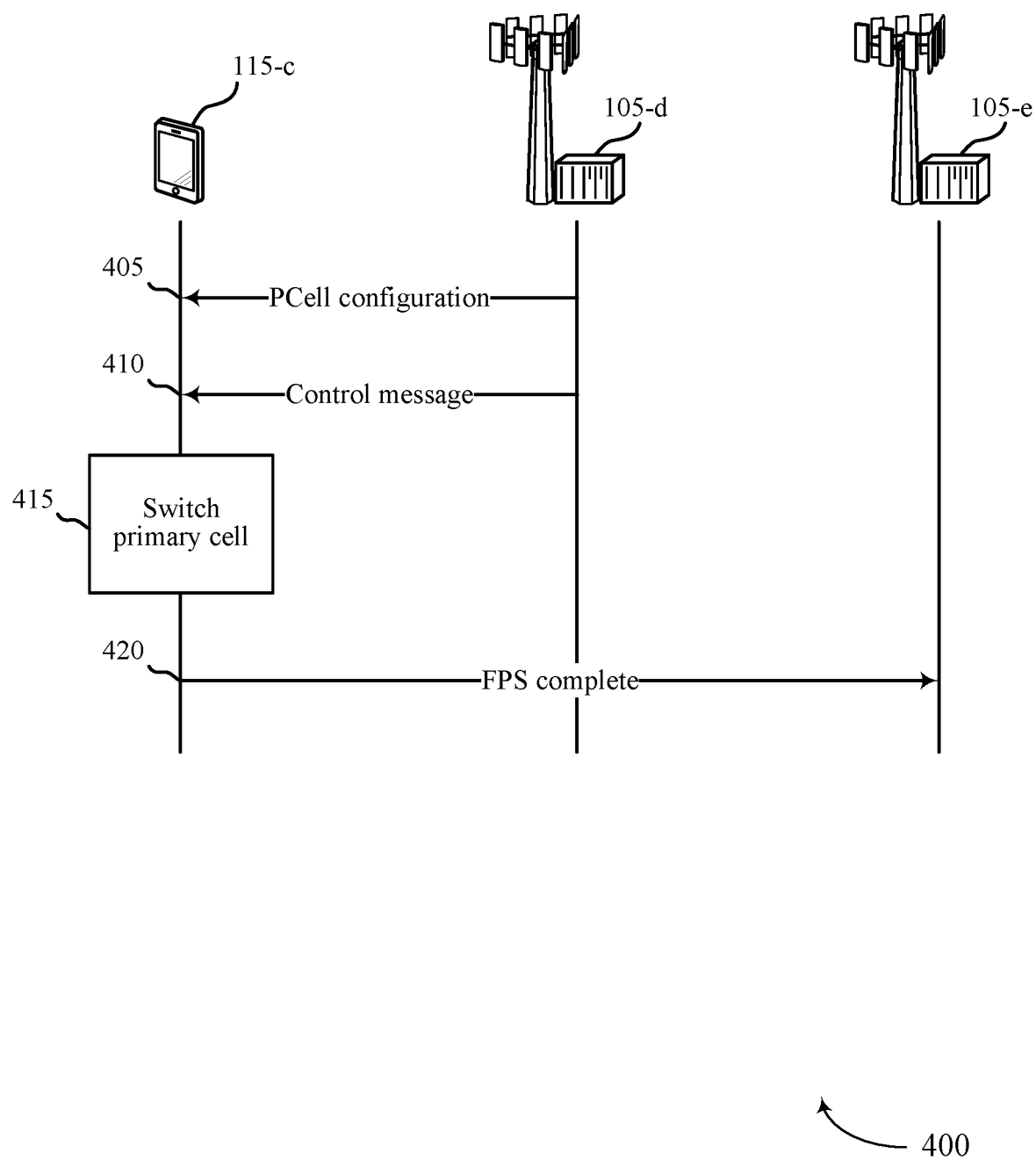
FIG. 4 illustrates an example of a process flow that supports fast primary cell switching in carrier aggregation in accordance with aspects of the present disclosure.

FIG. 4 illustrates an example of a process flow 400 that supports fast primary cell switching in carrier aggregation in accordance with aspects of the present disclosure. In some examples, some aspects of process flow 400 may implement or be implemented by aspects of wireless communications system 100. For example, process flow 400 may include a UE 115-*c*, a base station 105-*d* and a base station 105-*e*, which may be examples of a base station 105 or UE 115 described with reference to FIG. 1. In some cases, base station 105-*d* or base station 105-*e* may be configured as standalone base stations or as non-standalone base stations. In the illustrated example, base station 105-*d* may be configured as a first distributed unit base station and base station 105-*e* may be configured as a second distributed unit base station, where base station 105-*d* and base station 105-*e* are part of a centralized unit base station (e.g., the same centralized unit base station). Although reference is made to operations in relation to base station 105-*d* and base station 105-*e*, the described operations may be performed in relation to a single base station (e.g., base station 105-*d* or base station 105-*e*).

At 405, base station 105-*d* may transmit primary cell configuration information to UE 115-*c*. In some cases, UE 115-*c* may establish a first component carrier associated with base station 105-*d* as a primary cell and establish a second component carrier associated with base station 105-*e* as a secondary cell. In some cases, the primary cell configuration information may include a primary cell configuration that enables the second component carrier to be configured as a primary cell, and enables UE 115-*c* to communicate with the second component carrier configured as a primary cell. In some cases, the primary cell configuration information may include one or more primary cell configurations for one or more component carriers (e.g., at least a primary cell configuration for the second component carrier). In some cases, UE 115-*c* may receive the primary cell configuration information for the second component carrier while the second component carrier is the secondary cell for UE 115-*c*. In some cases, the described operations may be based on the first component carrier and the second component carrier being in a same timing advance group. In some cases, the described operations may be based on the first component carrier and the second component carrier being associated with a same base station (e.g., a centralized unit base station).

In some examples, UE 115-*c* may receive the primary cell configuration information in one or more transmissions (e.g., in a first transmission at a first time and in a second transmission at a second time, etc.). In some cases, UE 115-*c* may receive the primary cell configuration information for the second component carrier in a first transmission, then receive at least one update to the primary cell configuration information for the second component carrier in at least a second transmission after the first transmission. In some cases, UE 115-c may receive the primary cell configuration information for at least the second component carrier in a first transmission, then receive additional primary cell configuration information for at least a third component carrier in a second transmission after the first transmission.

In some examples, UE 115-c may use at least a portion of a configuration associated with the first component carrier as the primary cell (e.g., base station 105-d) with the second component carrier established as the primary cell (e.g., base station 105-e). In some cases, UE 115-c may determine (e.g., before receiving control message at 410), that the primary cell configuration information does not include at least a portion of a configuration for configuring the second component carrier as the primary cell. In some cases, UE 115-c may use at least a portion of a configuration associated with the first component carrier as the primary cell (e.g., base station 105-d) to generate or modify the configuration for the second component carrier as the primary cell (e.g., base station 105-e).

In some examples, UE 115-c may be associated with one or more secondary cells. In some cases, UE 115-c may receive primary cell configuration information for the one or more secondary cells to enable UE 115-c to configure a secondary cell of the one or more secondary cells as a primary cell. In some cases, the primary cell configuration information may include a first primary cell configuration of a first secondary cell of a component carrier and a second primary cell configuration of a second secondary cell of the component carrier or a different component carrier. In some cases, primary cell configuration information may be communicated to a UE via a serving cell configuration information element (e.g., ServingCellConfigIE) In some cases, the primary cell configuration information may include a physical uplink control channel configuration for secondary cells quickly switched to primary cells, a random access channel configuration for secondary cells quickly switched to primary cells, a measurement configuration for secondary cells quickly switched to primary cells, a radio link failure configuration for secondary cells quickly switched to primary cells, or a radio link monitoring configuration for secondary cells quickly switched to primary cells, or a combination thereof.

In some examples, a primary cell may be associated with a primary cell configuration and a secondary cell may be associated with a secondary cell configuration. In some cases, the secondary cell may be also associated with at least a portion of a fast switching primary cell configuration that enables the secondary cell to be quickly switched to a fast-switched primary cell. In some cases, the primary cell configuration of the primary cell configuration may supplement or add to the fast switching primary cell configuration. When the secondary cell switches to a fast-switched primary cell, a UE associated with the fast-switched primary cell may use at least a portion of the fast switching primary cell configuration, at least a portion of the primary cell configuration of the primary cell, or at least a portion of the secondary cell configuration of the secondary cell to interface with the fast-switched primary cell. In some cases, the secondary cell configuration of the secondary cell may include one or more parameters that include at least one of a physical downlink control channel configuration, a physical downlink shared channel configuration, or one or more other parameters, or any combination thereof. In some cases, the UE may use one or more parameters of the secondary cell configuration to interface with the fast-switched primary cell (e.g., the secondary cell quickly switched to a primary cell).

At 410, base station 105-d may transmit a control message to UE 115c. In some cases, the control message may trigger (e.g., include instructions or a command that triggers) a switch of the primary cell from the first component carrier (e.g., base station 105-d) to the second component carrier (e.g., base station 105-e). In some cases, the control message may include cell identifier information. In some cases, the cell identifier information may be associated with the second component carrier (e.g., base station 105-e). In some cases, the control message may include a bit field that indicates the second component carrier (e.g., base station 105-e). In some cases, the size of the bit field may depend on the number of configured serving cells. In some cases, the control message may trigger a switch of the secondary cell from the second component carrier to the first component carrier. In some cases, the control message may specify the primary cell configuration information to be used with the second component carrier when the second component carrier is established as the primary cell. In some cases, the primary cell configuration information may include multiple configurations and the control message may specify a configuration (e.g., of the multiple configurations) of the primary cell configuration information to be used with the second component carrier when the second component carrier is selected to be or established as the primary cell.

In some examples, the control message may be communicated via a downlink control information (DCI) message (e.g., addressed specifically to UE 115-c or to a group of UEs that includes UE 115-c), a media access control (MAC) message (e.g., MAC control element message), or a radio resource control (RRC) message, or any combination thereof. In some cases, the control message may include an indicator indicating whether the first component carrier is selected for deactivation. In some cases, the indicator may include a binary indicator (e.g., a 1-bit indicator). In some cases, the DCI message may include a field dedicated to indicating one or more of: that the second component carrier is selected to be established as the primary cell, that the first component carrier is selected to be established as the secondary cell, or whether the first component carrier is selected for deactivation, or any combination thereof. In some cases, a header of the MAC message may be configured to indicate one or more of: that the second component carrier is selected to be established as the primary cell, that the first component carrier is selected to be established as the secondary cell, or whether the first component carrier is selected for deactivation, or any combination thereof.

At 415, UE 115-c may switch primary cells. In some cases, UE 115-c may establish the second component carrier as the primary cell for UE 115-c based on the control message and in accordance with the primary cell configuration information associated with the second component carrier.

At 420, UE 115-c may transmit a completion message to base station 105-e. Additionally, or alternatively, UE 115-c may transmit a completion message to base station 105-d. The completion message may indicate that a fast primary cell switch procedure is complete. In some cases, the completion message may be transmitted via the second component carrier configured as the primary cell or via the first component carrier configured as the secondary cell. In some cases, UE 115-c may transmit the completion message based on the second component carrier being established as the primary cell. In some cases, the completion message may be transmitted in a dedicated field of uplink control information via a physical uplink control channel or a physical uplink shared channel. In some cases, the completion message may be transmitted via a hybrid automatic repeat request acknowledgment.

In some cases, base station 105-*d* or base station 105-*e* may maintain, based on the control message, a second primary cell associated with a second group of one or more UEs on the second component carrier (e.g., base station 105-*e*) and a second secondary cell associated with the second group of one or more UEs on the first component carrier (e.g., base station 105-*d*). In some cases, UE 115-*c* may be associated with a first group of one or more UEs different from the second group of one or more UEs. In some cases, base station 105-*d* or base station 105-*e* may deactivate the first component carrier (e.g., base station 105-*d*) in accordance with the control message.

In some examples, UE 115-*c* may receive a second control message triggering a switch of the primary cell from the second component carrier back to the first component carrier. In some cases, UE 115-*c* may reestablish the first component carrier as the primary cell for UE 115-*c* and the second component carrier as the secondary cell for UE 115-*c* based on the second control message. In some examples, the control message may be received based on a first network condition or the second control message may be received based on a second network condition, or both. In some cases, the first network condition or the second network condition is, or both are, based on a network load associated with the first component carrier or a network load associated with the second component carrier, or a network load associated with the first component carrier and the second component carrier.

Figure 5:
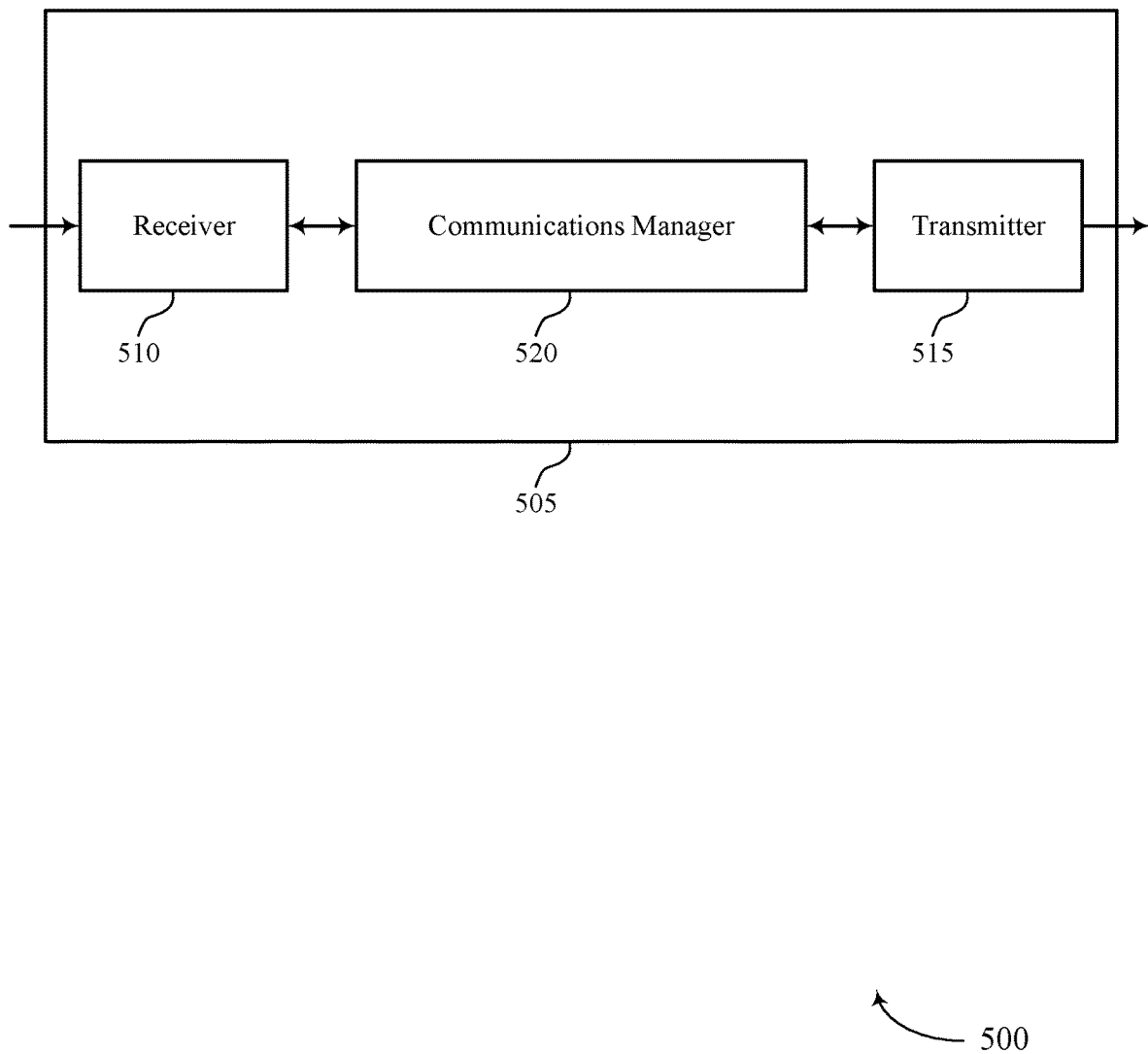
FIGS. 5 and 6 show block diagrams of devices that support fast primary cell switching in carrier aggregation in accordance with aspects of the present disclosure.

FIG. 5 shows a block diagram 500 of a device 505 that supports fast primary cell switching in carrier aggregation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to fast primary cell switching in carrier aggregation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to fast primary cell switching in carrier aggregation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of fast primary cell switching in carrier aggregation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for establishing a first component carrier as a primary cell for the UE and a second component carrier as a secondary cell for the UE. The communications manager 520 may be configured as or otherwise support a means for receiving primary cell configuration information for the second component carrier while the second component carrier is the secondary cell for the UE. The communications manager 520 may be configured as or otherwise support a means for receiving a control message triggering a switch of the primary cell from the first component carrier to the second component carrier. The communications manager 520 may be configured as or otherwise support a means for establishing the second component carrier as the primary cell for the UE based on the control message and in accordance with the primary cell configuration information associated with the second component carrier.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increasing the efficiency of wireless communications system 200 such that a device may perform a primary cell switching procedure that is relatively faster than switching based on the RRC reconfiguration and random access procedures of other systems. The described techniques may provide multiple benefits, including reduced processing, reduced power consumption, more efficient utilization of communication resources, thus improving quality of service.

Figure 6:
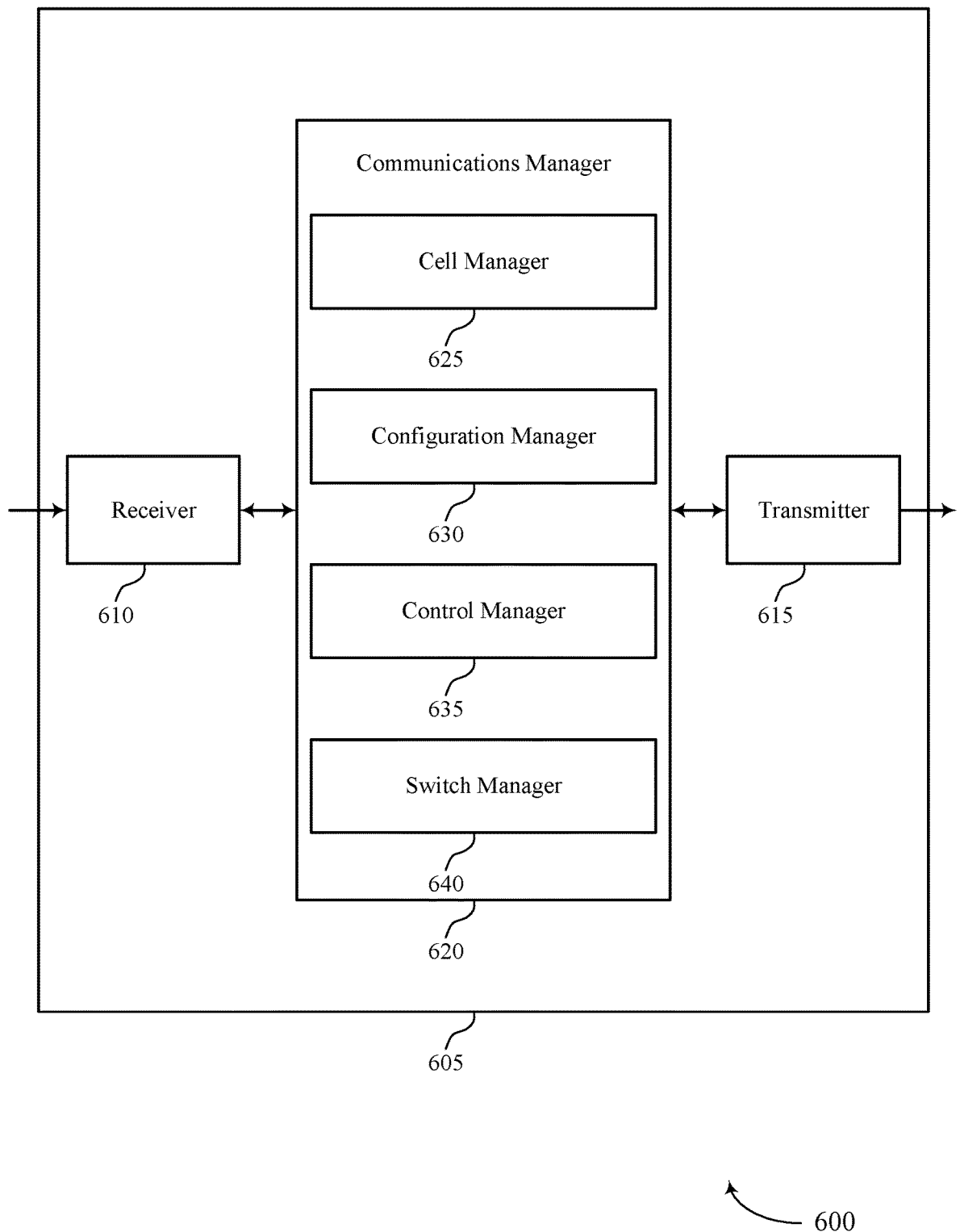

FIG. 6 shows a block diagram 600 of a device 605 that supports fast primary cell switching in carrier aggregation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to fast primary cell switching in carrier aggregation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to fast primary cell switching in carrier aggregation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of fast primary cell switching in carrier aggregation as described herein. For example, the communications manager 620 may include a cell manager 625, a configuration manager 630, a control manager 635, a switch manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The cell manager 625 may be configured as or otherwise support a means for establishing a first component carrier as a primary cell for the UE and a second component carrier as a secondary cell for the UE. The configuration manager 630 may be configured as or otherwise support a means for receiving primary cell configuration information for the second component carrier while the second component carrier is the secondary cell for the UE. The control manager 635 may be configured as or otherwise support a means for receiving a control message triggering a switch of the primary cell from the first component carrier to the second component carrier. The switch manager 640 may be configured as or otherwise support a means for establishing the second component carrier as the primary cell for the UE based on the control message and in accordance with the primary cell configuration information associated with the second component carrier.

Figure 7:
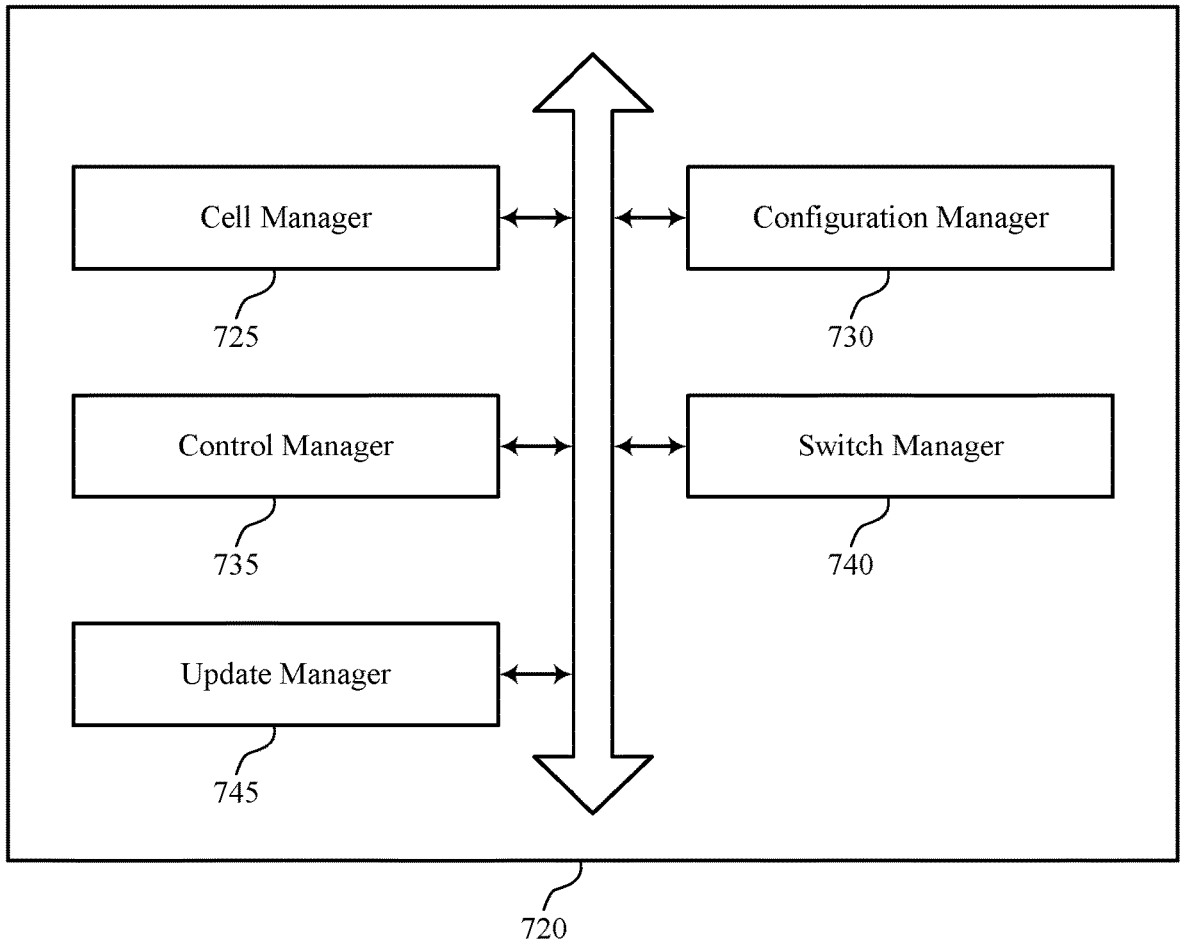
FIG. 7 shows a block diagram of a communications manager that supports fast primary cell switching in carrier aggregation in accordance with aspects of the present disclosure.

FIG. 7 shows a block diagram 700 of a communications manager 720 that supports fast primary cell switching in carrier aggregation in accordance with aspects of the present disclosure. The communications manager 720 may be an example of aspects of a communications manager 520, a communications manager 620, or both, as described herein. The communications manager 720, or various components thereof, may be an example of means for performing various aspects of fast primary cell switching in carrier aggregation as described herein. For example, the communications manager 720 may include a cell manager 725, a configuration manager 730, a control manager 735, a switch manager 740, an update manager 745, or any combination thereof. Each of these components may communicate, directly or indirectly, with one another (e.g., via one or more buses).

The cell manager 725 may be configured as or otherwise support a means for establishing a first component carrier as a primary cell for the UE and a second component carrier as a secondary cell for the UE. The configuration manager 730 may be configured as or otherwise support a means for receiving primary cell configuration information for the second component carrier while the second component carrier is the secondary cell for the UE. The control manager 735 may be configured as or otherwise support a means for receiving a control message triggering a switch of the primary cell from the first component carrier to the second component carrier. The switch manager 740 may be configured as or otherwise support a means for establishing the second component carrier as the primary cell for the UE based on the control message and in accordance with the primary cell configuration information associated with the second component carrier.

In some examples, the configuration manager 730 may be configured as or otherwise support a means for receiving the primary cell configuration information after receiving a previous primary cell configuration information for a set of one or more secondary cells associated with the second component carrier and in connection with the secondary cell being added to the set of one or more secondary cells prior to receiving the control message.

In some examples, the update manager 745 may be configured as or otherwise support a means for receiving an update to the primary cell configuration information prior to receiving the control message. In some examples, the update manager 745 may be configured as or otherwise support a means for incorporating the update into the primary cell configuration information prior to establishing the second component carrier as the primary cell for the UE.

In some examples, the configuration manager 730 may be configured as or otherwise support a means for using at least a portion of a configuration associated with the first component carrier as the primary cell with the second component carrier established as the primary cell.

In some examples, the configuration manager 730 may be configured as or otherwise support a means for determining, before receiving the control message, that the primary cell configuration information does not include at least a portion of a configuration for configuring the second component carrier as the primary cell. In some examples, the configuration manager 730 may be configured as or otherwise support a means for using at least a portion of a configuration associated with the first component carrier as the primary cell to generate or modify the configuration for the second component carrier as the primary cell.

In some examples, the primary cell configuration information includes a first primary cell configuration of a first secondary cell of the second component carrier and a second primary cell configuration of a second secondary cell of the second component carrier.

In some examples, the primary cell configuration information includes a physical uplink control channel configuration for primary cells, a random access channel configuration for primary cells, a measurement configuration for primary cells, a radio link failure configuration for primary cells, or a radio link monitoring configuration for primary cells, or a combination thereof.

In some examples, the control message specifies the primary cell configuration information to be used with the second component carrier when the second component carrier is established as the primary cell.

In some examples, the control message may include a downlink control information message. The downlink control information message may include a field dedicated to indicating one or more of that the second component carrier is selected to be established as the primary cell, that the first component carrier is selected to be established as the secondary cell, or whether the first component carrier is selected for deactivation, or any combination thereof. In some examples, the control message includes an indicator indicating whether the first component carrier is selected for deactivation.

In some examples, the control message may include a media access control message. In some cases, a header of the media access control message may indicate one or more of that the second component carrier is selected to be established as the primary cell, that the first component carrier is selected to be established as the secondary cell, or whether the first component carrier is selected for deactivation, or any combination thereof.

In some examples, the control message may include a radio resource control message indicating one or more of that the second component carrier is selected to be established as the primary cell, that the first component carrier is selected to be established as the secondary cell, or whether the first component carrier is selected for deactivation, or any combination thereof.

In some examples, the configuration manager 730 may be configured as or otherwise support a means for transmitting a completion message based on establishing the second component carrier as the primary cell, where the completion message is transmitted via the second component carrier as the primary cell or the first component carrier as the secondary cell.

In some examples, the completion message is transmitted in a dedicated field of uplink control information via a physical uplink control channel or a physical uplink shared channel. In some examples, the completion message is transmitted via a hybrid automatic repeat request acknowledgment.

In some examples, the fast primary cell switching is based on the first component carrier and the second component carrier being in a same timing advance group. In some examples, the fast primary cell switching is based on the first component carrier and the second component carrier being associated with a same base station.

In some examples, the switch manager 740 may be configured as or otherwise support a means for receiving a second control message triggering a switch of the primary cell from the second component carrier back to the first component carrier. In some examples, the switch manager 740 may be configured as or otherwise support a means for reestablishing the first component carrier as the primary cell for the UE and the second component carrier as the secondary cell for the UE based on the second control message.

In some examples, the switch manager 740 may be configured as or otherwise support a means for where the control message is received based on a first network condition or the second control message is received based on a second network condition, or both. In some examples, the switch manager 740 may be configured as or otherwise support a means for where the first network condition or the second network condition is, or both are, based on a network load associated with the first component carrier or a network load associated with the second component carrier, or a network load associated with the first component carrier and the second component carrier.

Figure 8:
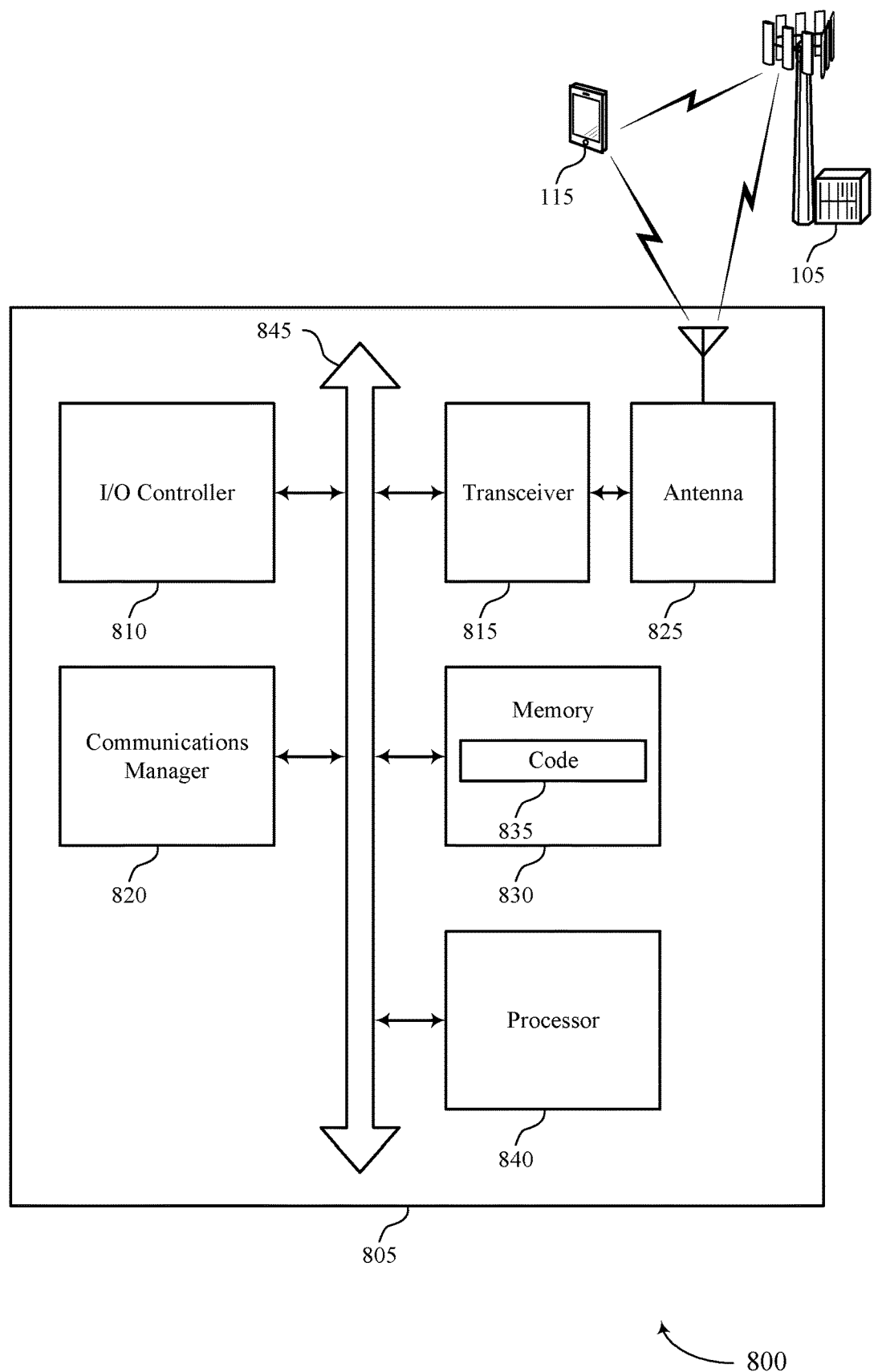
FIG. 8 shows a diagram of a system including a device that supports fast primary cell switching in carrier aggregation in accordance with aspects of the present disclosure.

FIG. 8 shows a diagram of a system 800 including a device 805 that supports fast primary cell switching in carrier aggregation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting fast primary cell switching in carrier aggregation). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for establishing a first component carrier as a primary cell for the UE and a second component carrier as a secondary cell for the UE. The communications manager 820 may be configured as or otherwise support a means for receiving primary cell configuration information for the second component carrier while the second component carrier is the secondary cell for the UE. The communications manager 820 may be configured as or otherwise support a means for receiving a control message triggering a switch of the primary cell from the first component carrier to the second component carrier. The communications manager 820 may be configured as or otherwise support a means for establishing the second component carrier as the primary cell for the UE based on the control message and in accordance with the primary cell configuration information associated with the second component carrier.

By including or configuring the communications manager 820 in accordance with examples as described herein, the device 805 may support techniques for increasing the efficiency of wireless communications system 200 such that a device may perform a primary cell switching procedure that is relatively faster than switching based on the RRC reconfiguration and random access procedures of other systems. The described techniques may provide multiple benefits, including improved communication reliability, reduced latency, improved user experience related to reduced processing, reduced power consumption, more efficient utilization of communication resources, improved coordination between devices, longer battery life, improved utilization of processing capability, thus improving quality of service.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of fast primary cell switching in carrier aggregation as described herein, or the processor 840 and the memory 830 may be otherwise configured to perform or support such operations.

Figure 9:
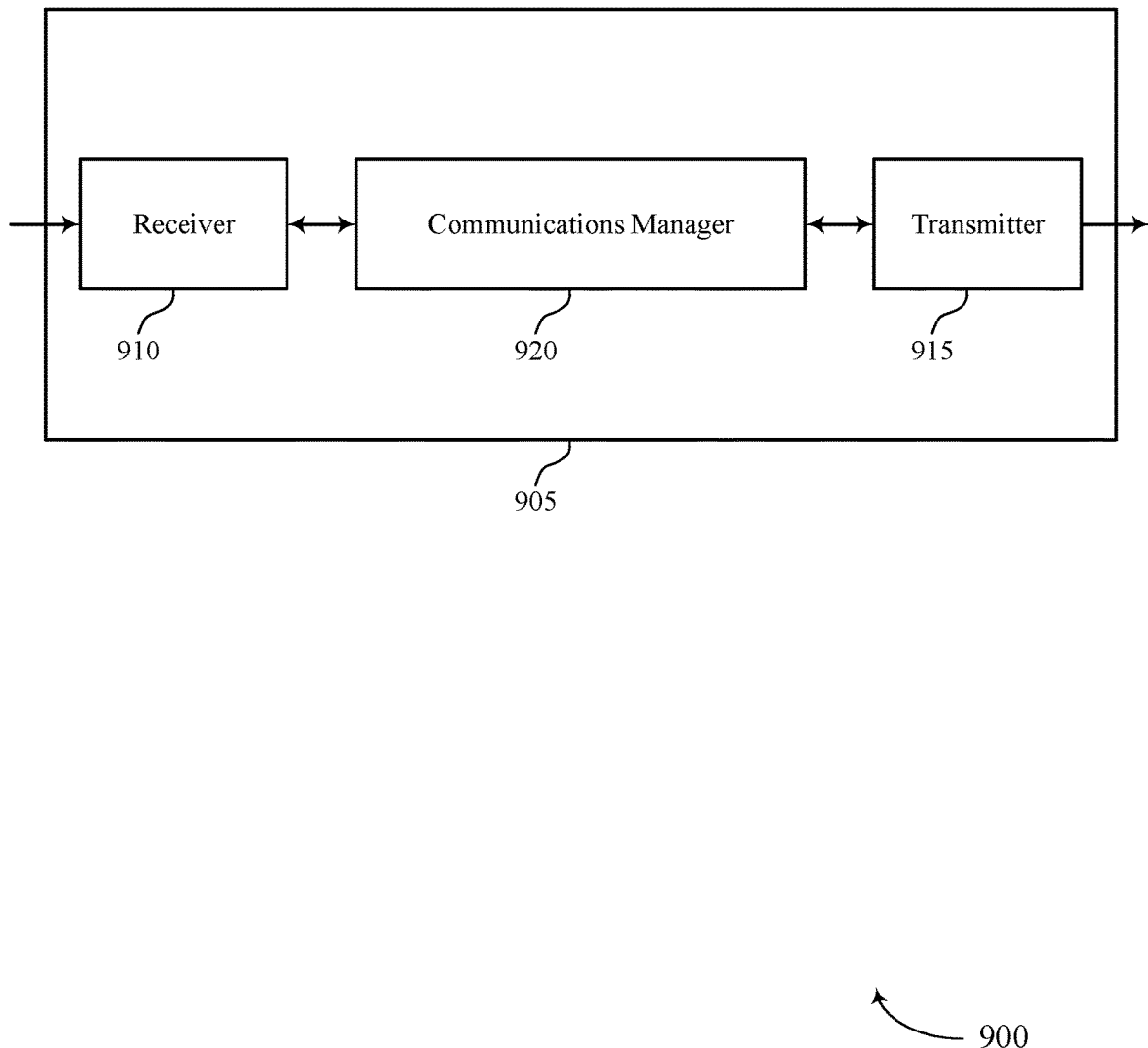
FIGS. 9 and 10 show block diagrams of devices that support fast primary cell switching in carrier aggregation in accordance with aspects of the present disclosure.

FIG. 9 shows a block diagram 900 of a device 905 that supports fast primary cell switching in carrier aggregation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to fast primary cell switching in carrier aggregation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to fast primary cell switching in carrier aggregation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of fast primary cell switching in carrier aggregation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

For example, the communications manager 920 may be configured as or otherwise support a means for establishing a first component carrier as a primary cell for a UE and a second component carrier as a secondary cell for the UE. The communications manager 920 may be configured as or otherwise support a means for transmitting, to the UE, primary cell configuration information for the second component carrier while the second component carrier is the secondary cell for the UE. The communications manager 920 may be configured as or otherwise support a means for transmitting, to the UE, a control message triggering a switch of the primary cell from the first component carrier to the second component carrier. The communications manager 920 may be configured as or otherwise support a means for establishing the second component carrier as the primary cell for the UE based on the control message and in accordance with the primary cell configuration information associated with the second component carrier.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increasing the efficiency of wireless communications system 200 such that a device may perform a primary cell switching procedure that is relatively faster than switching based on the RRC reconfiguration and random access procedures of other systems. The described techniques may provide multiple benefits, including reduced processing, reduced power consumption, more efficient utilization of communication resources, thus improving quality of service.

Figure 10:
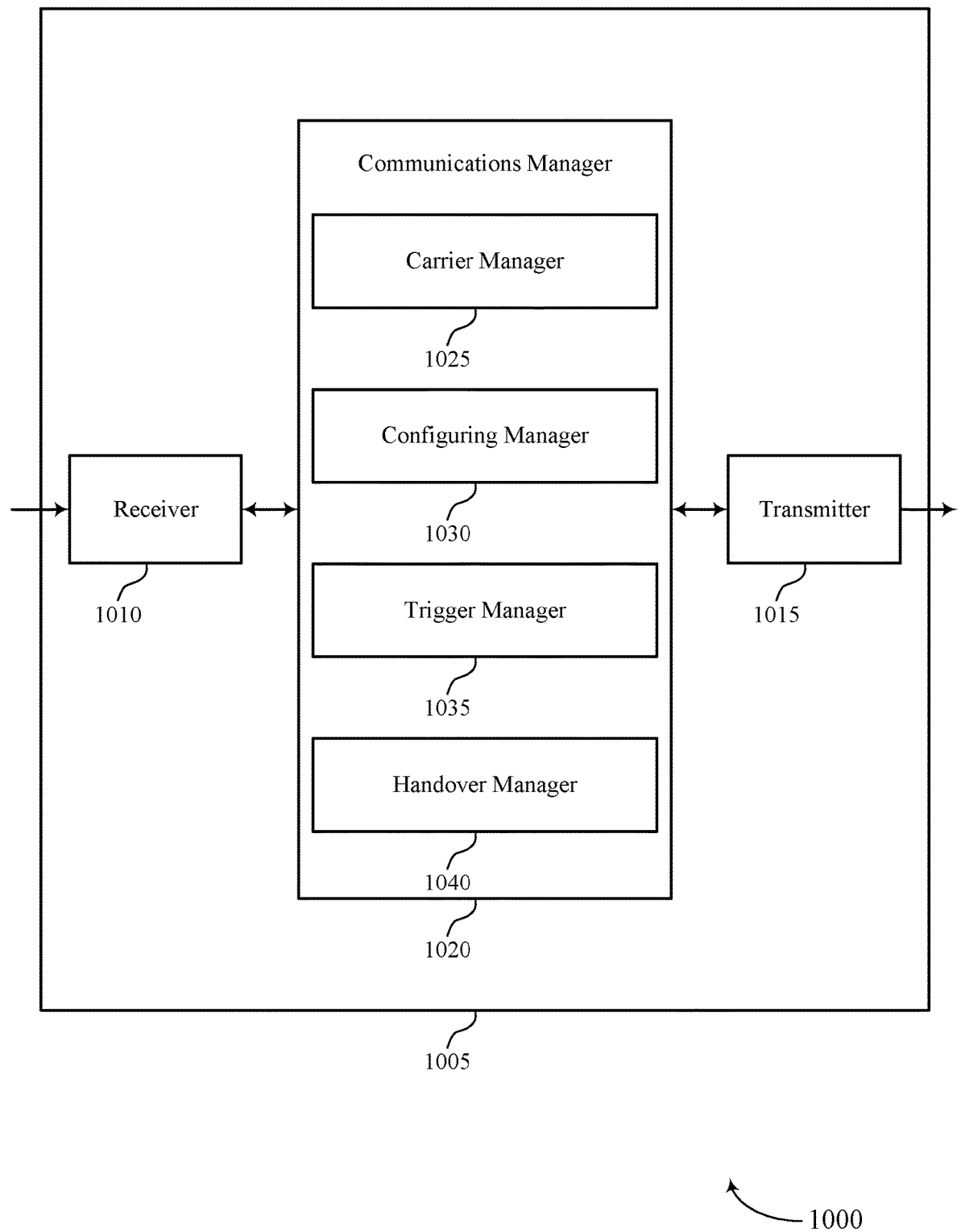

FIG. 10 shows a block diagram 1000 of a device 1005 that supports fast primary cell switching in carrier aggregation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to fast primary cell switching in carrier aggregation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to fast primary cell switching in carrier aggregation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of fast primary cell switching in carrier aggregation as described herein. For example, the communications manager 1020 may include a carrier manager 1025, a configuring manager 1030, a trigger manager 1035, a handover manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The carrier manager 1025 may be configured as or otherwise support a means for establishing a first component carrier as a primary cell for a UE and a second component carrier as a secondary cell for the UE. The configuring manager 1030 may be configured as or otherwise support a means for transmitting, to the UE, primary cell configuration information for the second component carrier while the second component carrier is the secondary cell for the UE. The trigger manager 1035 may be configured as or otherwise support a means for transmitting, to the UE, a control message triggering a switch of the primary cell from the first component carrier to the second component carrier. The handover manager 1040 may be configured as or otherwise support a means for establishing the second component carrier as the primary cell for the UE based on the control message and in accordance with the primary cell configuration information associated with the second component carrier.

Figure 11:
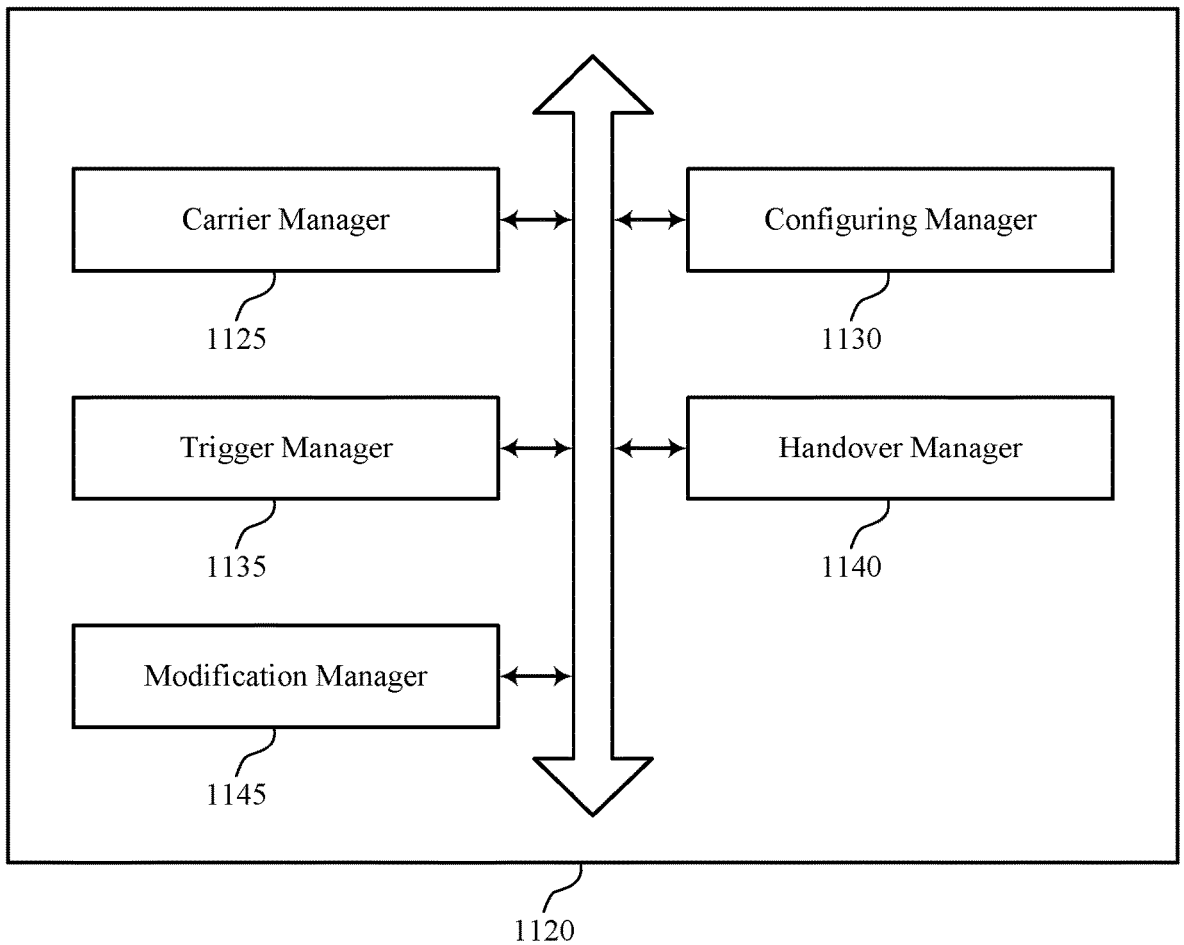
FIG. 11 shows a block diagram of a communications manager that supports fast primary cell switching in carrier aggregation in accordance with aspects of the present disclosure.

FIG. 11 shows a block diagram 1100 of a communications manager 1120 that supports fast primary cell switching in carrier aggregation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of fast primary cell switching in carrier aggregation as described herein. For example, the communications manager 1120 may include a carrier manager 1125, a configuring manager 1130, a trigger manager 1135, a handover manager 1140, a modification manager 1145, or any combination thereof. Each of these components may communicate, directly or indirectly, with one another (e.g., via one or more buses).

The carrier manager 1125 may be configured as or otherwise support a means for establishing a first component carrier as a primary cell for a UE and a second component carrier as a secondary cell for the UE. The configuring manager 1130 may be configured as or otherwise support a means for transmitting, to the UE, primary cell configuration information for the second component carrier while the second component carrier is the secondary cell for the UE. The trigger manager 1135 may be configured as or otherwise support a means for transmitting, to the UE, a control message triggering a switch of the primary cell from the first component carrier to the second component carrier. The handover manager 1140 may be configured as or otherwise support a means for establishing the second component carrier as the primary cell for the UE based on the control message and in accordance with the primary cell configuration information associated with the second component carrier.

In some examples, the configuring manager 1130 may be configured as or otherwise support a means for transmitting the primary cell configuration information after transmitting a previous primary cell configuration information for a set of one or more secondary cells associated with the second component carrier and in connection with the secondary cell being added to the set of one or more secondary cells prior to receiving the control message.

In some examples, the modification manager 1145 may be configured as or otherwise support a means for transmitting an update to the primary cell configuration information prior to receiving the control message.

In some examples, the primary cell configuration information includes a first primary cell configuration of a first secondary cell of the second component carrier and a second primary cell configuration of a second secondary cell of the second component carrier.

In some examples, the primary cell configuration information includes a physical uplink control channel configuration for primary cells, a random access channel configuration for primary cells, a measurement configuration for primary cells, a radio link failure configuration for primary cells, or a radio link monitoring configuration for primary cells, or a combination thereof.

In some examples, the control message specifies the primary cell configuration information to be used with the second component carrier when the second component carrier is established as the primary cell.

In some examples, the control message may include a downlink control information message. The downlink control information message may include a field dedicated to indicating one or more of that the second component carrier is selected to be established as the primary cell, that the first component carrier is selected to be established as the secondary cell, or whether the first component carrier is selected for deactivation, or any combination thereof. In some examples, the control message includes an indicator indicating whether the first component carrier is selected for deactivation.

In some examples, the control message may include a media access control message. In some cases, a header of the media access control message may indicate one or more of that the second component carrier is selected to be established as the primary cell, that the first component carrier is selected to be established as the secondary cell, or whether the first component carrier is selected for deactivation, or any combination thereof.

In some examples, the control message may include a radio resource control message indicating one or more of that the second component carrier is selected to be established as the primary cell, that the first component carrier is selected to be established as the secondary cell, or whether the first component carrier is selected for deactivation, or any combination thereof.

In some examples, the configuring manager 1130 may be configured as or otherwise support a means for receiving a completion message based on establishing the second component carrier as the primary cell, where the completion message is received via the second component carrier as the primary cell or the first component carrier as the secondary cell.

In some examples, the completion message is received in a dedicated field of uplink control information via a physical uplink control channel or a physical uplink shared channel. In some examples, the completion message is received via a hybrid automatic repeat request acknowledgment.

In some examples, the fast primary cell switching is based on the first component carrier and the second component carrier being in a same timing advance group. In some examples, the fast primary cell switching is based on the first component carrier and the second component carrier being associated with the base station.

In some examples, the configuring manager 1130 may be configured as or otherwise support a means for maintaining, based on the control message, a second primary cell on the second component carrier and a second secondary cell on the first component carrier, the primary cell and the secondary cell associated with a first group of UEs including the UE, and the second primary cell and second secondary cell associated with a second group of UEs different from the first group of UEs. In some examples, the configuring manager 1130 may be configured as or otherwise support a means for deactivating the first component carrier based on the control message.

In some examples, the handover manager 1140 may be configured as or otherwise support a means for transmitting, to the UE, a second control message triggering a switch of the primary cell from the second component carrier back to the first component carrier. In some examples, the handover manager 1140 may be configured as or otherwise support a means for reestablishing the first component carrier as the primary cell for the UE and the second component carrier as the secondary cell for the UE based on the second control message.

In some examples, the handover manager 1140 may be configured as or otherwise support a means for where the control message is transmitted based on a first network condition or the second control message is transmitted based on a second network condition, or both. In some examples, the handover manager 1140 may be configured as or otherwise support a means for where the first network condition or the second network condition is, or both are, based on a network load associated with the first component carrier or a network load associated with the second component carrier, or a network load associated with the first component carrier and the second component carrier.

Figure 12:
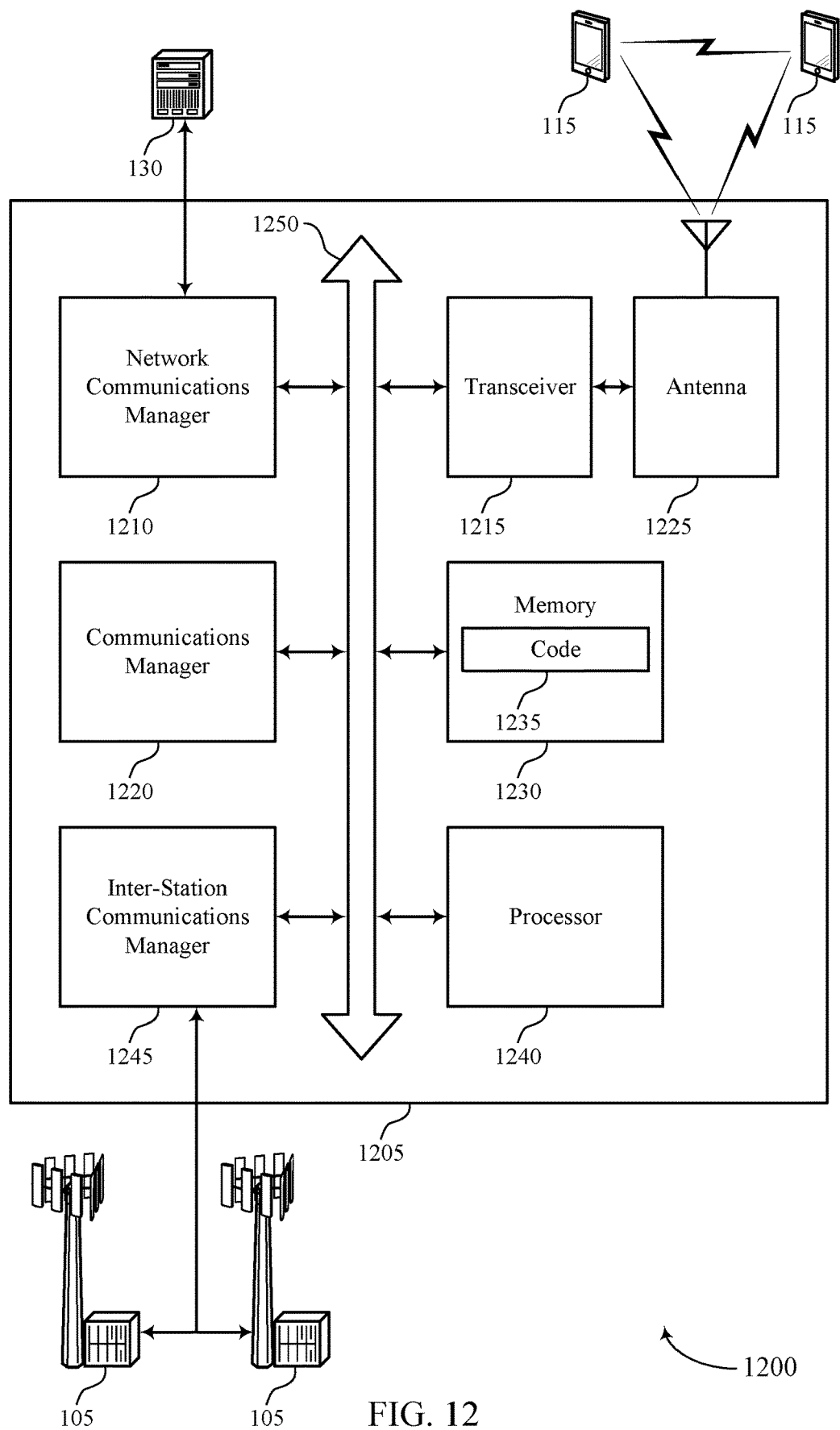
FIG. 12 shows a diagram of a system including a device that supports fast primary cell switching in carrier aggregation in accordance with aspects of the present disclosure.

FIG. 12 shows a diagram of a system 1200 including a device 1205 that supports fast primary cell switching in carrier aggregation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting fast primary cell switching in carrier aggregation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

For example, the communications manager 1220 may be configured as or otherwise support a means for establishing a first component carrier as a primary cell for a UE and a second component carrier as a secondary cell for the UE. The communications manager 1220 may be configured as or otherwise support a means for transmitting, to the UE, primary cell configuration information for the second component carrier while the second component carrier is the secondary cell for the UE. The communications manager 1220 may be configured as or otherwise support a means for transmitting, to the UE, a control message triggering a switch of the primary cell from the first component carrier to the second component carrier. The communications manager 1220 may be configured as or otherwise support a means for establishing the second component carrier as the primary cell for the UE based on the control message and in accordance with the primary cell configuration information associated with the second component carrier.

By including or configuring the communications manager 1220 in accordance with examples as described herein, the device 1205 may support techniques for increasing the efficiency of wireless communications system 200 such that a device may perform a primary cell switching procedure that is relatively faster than switching based on the RRC reconfiguration and random access procedures of other systems. The described techniques may provide multiple benefits, including improved communication reliability, reduced latency, improved user experience related to reduced processing, reduced power consumption, more efficient utilization of communication resources, improved coordination between devices, longer battery life, improved utilization of processing capability, thus improving quality of service.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of fast primary cell switching in carrier aggregation as described herein, or the processor 1240 and the memory 1230 may be otherwise configured to perform or support such operations.

Figure 13:
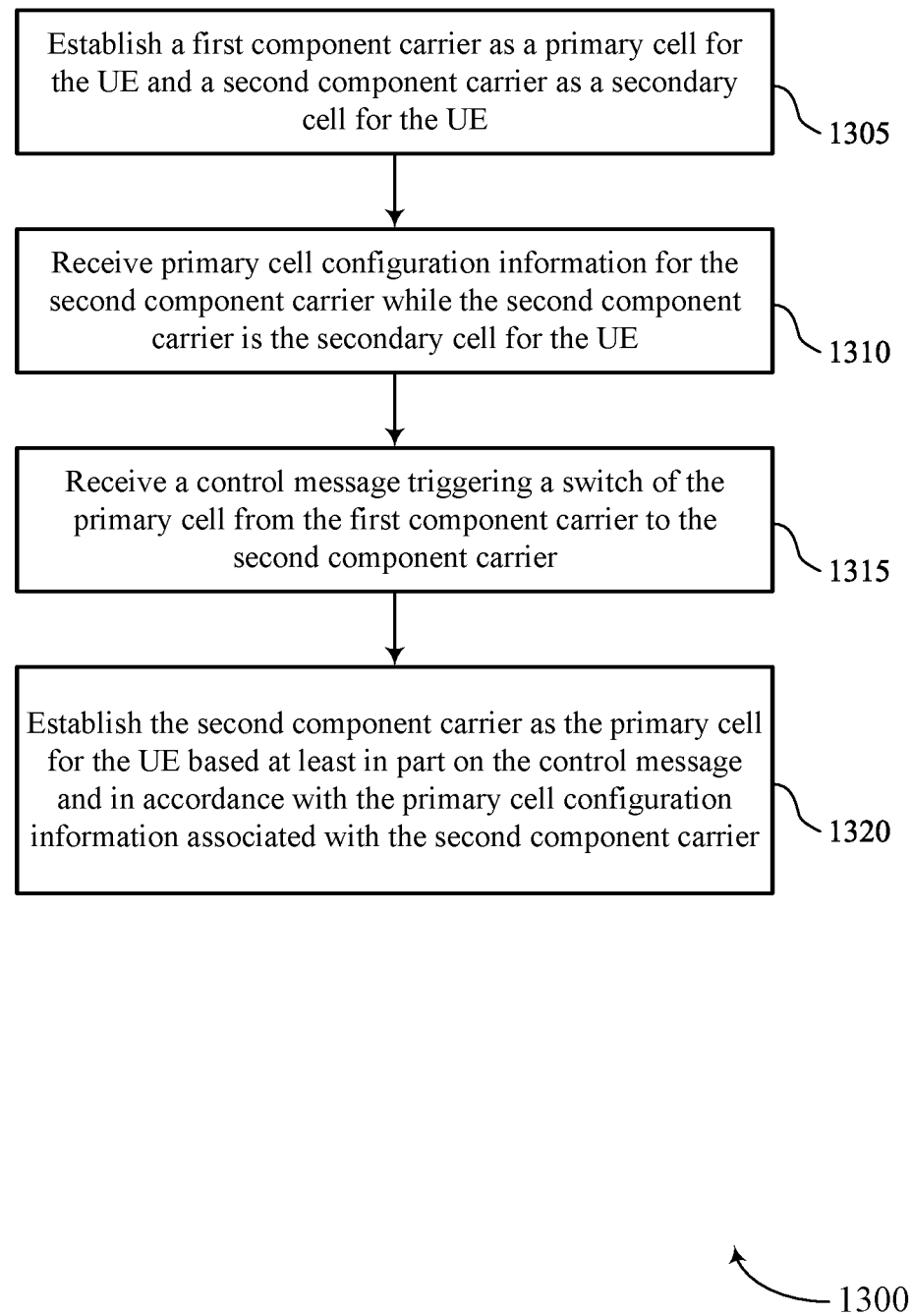
FIGS. 13 through 16 show flowcharts illustrating methods that support fast primary cell switching in carrier aggregation in accordance with aspects of the present disclosure.

FIG. 13 shows a flowchart illustrating a method 1300 that supports fast primary cell switching in carrier aggregation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include establishing a first component carrier as a primary cell for the UE and a second component carrier as a secondary cell for the UE. The operations of 1305 may be performed in accordance with examples as disclosed herein. In some examples, aspects of the operations of 1305 may be performed by a cell manager 725 as described with reference to FIG. 7.

At 1310, the method may include receiving primary cell configuration information for the second component carrier while the second component carrier is the secondary cell for the UE. The operations of 1310 may be performed in accordance with examples as disclosed herein. In some examples, aspects of the operations of 1310 may be performed by a configuration manager 730 as described with reference to FIG. 7.

At 1315, the method may include receiving a control message triggering a switch of the primary cell from the first component carrier to the second component carrier. The operations of 1315 may be performed in accordance with examples as disclosed herein. In some examples, aspects of the operations of 1315 may be performed by a control manager 735 as described with reference to FIG. 7.

At 1320, the method may include establishing the second component carrier as the primary cell for the UE based on the control message and in accordance with the primary cell configuration information associated with the second component carrier. The operations of 1320 may be performed in accordance with examples as disclosed herein. In some examples, aspects of the operations of 1320 may be performed by a switch manager 740 as described with reference to FIG. 7.

Figure 14:
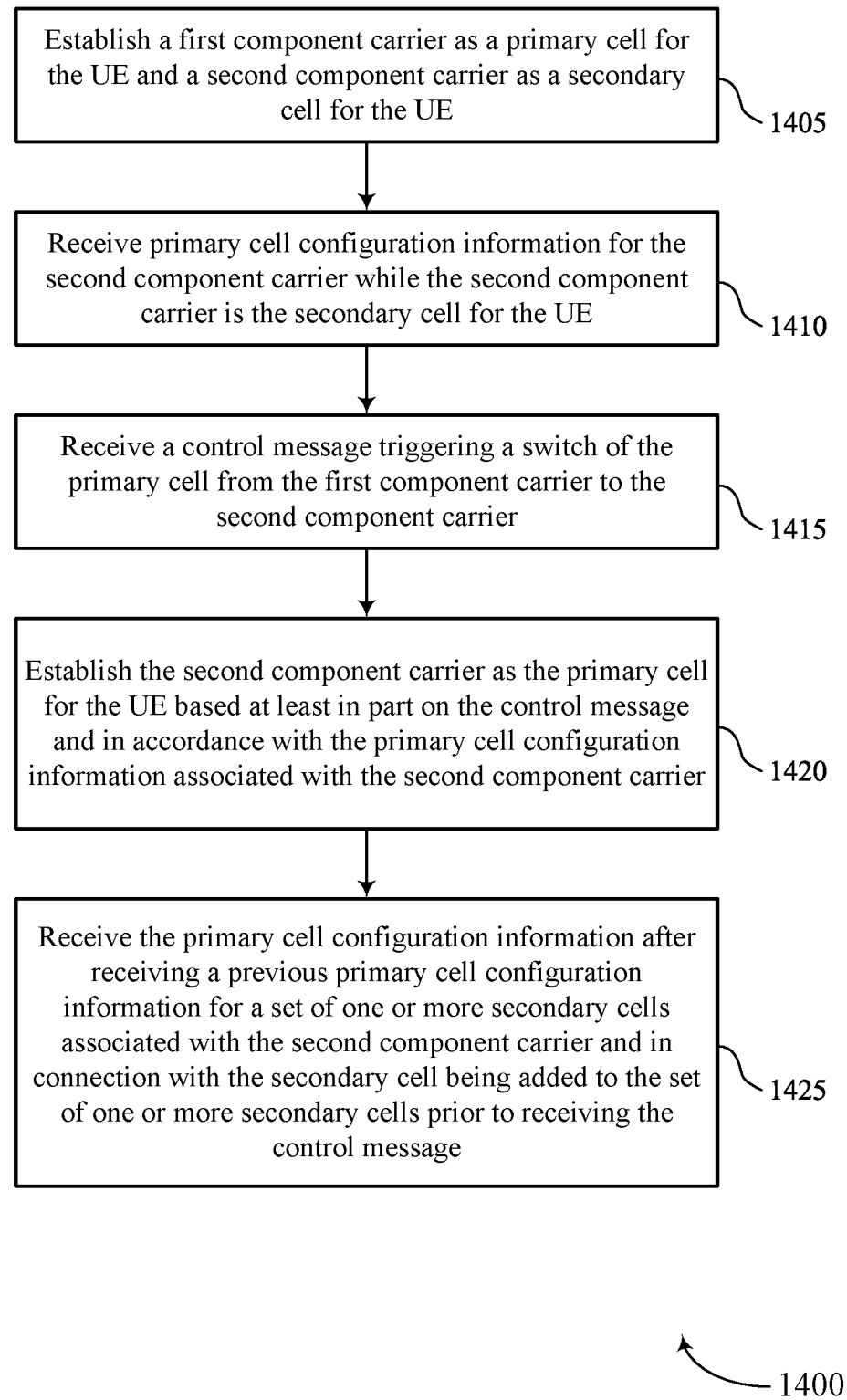

FIG. 14 shows a flowchart illustrating a method 1400 that supports fast primary cell switching in carrier aggregation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include establishing a first component carrier as a primary cell for the UE and a second component carrier as a secondary cell for the UE. The operations of 1405 may be performed in accordance with examples as disclosed herein. In some examples, aspects of the operations of 1405 may be performed by a cell manager 725 as described with reference to FIG. 7.

At 1410, the method may include receiving a primary cell configuration information after receiving a previous primary cell configuration information for a set of one or more secondary cells associated with the second component carrier and in connection with the secondary cell being added to the set of one or more secondary cells prior to receiving the control message. The operations of 1410 may be performed in accordance with examples as disclosed herein. In some examples, aspects of the operations of 1410 may be performed by a configuration manager 730 as described with reference to FIG. 7.

At 1415, the method may include receiving a control message triggering a switch of the primary cell from the first component carrier to the second component carrier. The operations of 1415 may be performed in accordance with examples as disclosed herein. In some examples, aspects of the operations of 1415 may be performed by a control manager 735 as described with reference to FIG. 7.

At 1420, the method may include establishing the second component carrier as the primary cell for the UE based on the control message and in accordance with the primary cell configuration information associated with the second component carrier. The operations of 1420 may be performed in accordance with examples as disclosed herein. In some examples, aspects of the operations of 1420 may be performed by a switch manager 740 as described with reference to FIG. 7.

Figure 15:
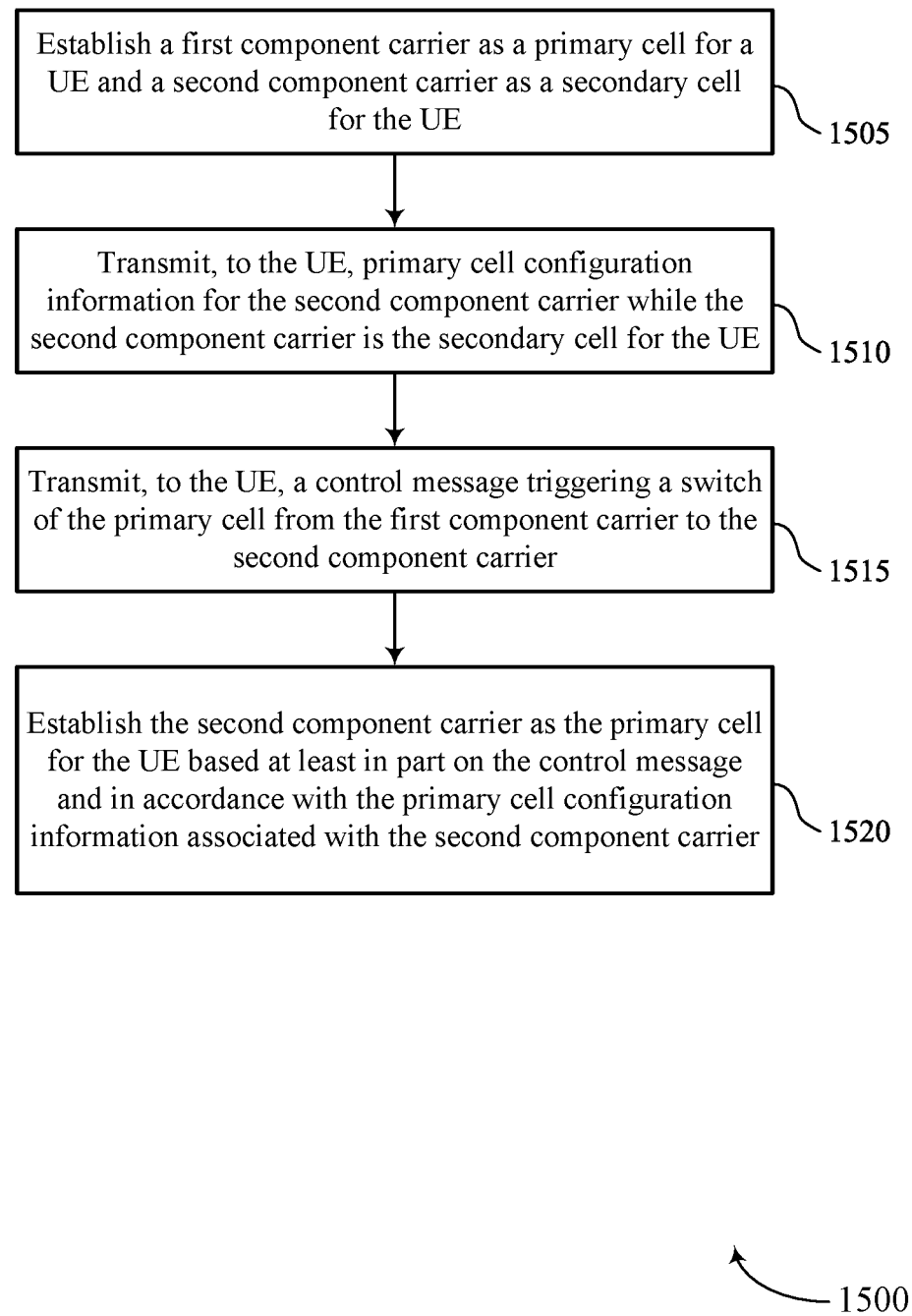

FIG. 15 shows a flowchart illustrating a method 1500 that supports fast primary cell switching in carrier aggregation in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include establishing a first component carrier as a primary cell for a UE and a second component carrier as a secondary cell for the UE. The operations of 1505 may be performed in accordance with examples as disclosed herein. In some examples, aspects of the operations of 1505 may be performed by a carrier manager 1125 as described with reference to FIG. 11.

At 1510, the method may include transmitting, to the UE, primary cell configuration information for the second component carrier while the second component carrier is the secondary cell for the UE. The operations of 1510 may be performed in accordance with examples as disclosed herein. In some examples, aspects of the operations of 1510 may be performed by a configuring manager 1130 as described with reference to FIG. 11.

At 1515, the method may include transmitting, to the UE, a control message triggering a switch of the primary cell from the first component carrier to the second component carrier. The operations of 1515 may be performed in accordance with examples as disclosed herein. In some examples, aspects of the operations of 1515 may be performed by a trigger manager 1135 as described with reference to FIG. 11.

At 1520, the method may include establishing the second component carrier as the primary cell for the UE based on the control message and in accordance with the primary cell configuration information associated with the second component carrier. The operations of 1520 may be performed in accordance with examples as disclosed herein. In some examples, aspects of the operations of 1520 may be performed by a handover manager 1140 as described with reference to FIG. 11.

Figure 16:
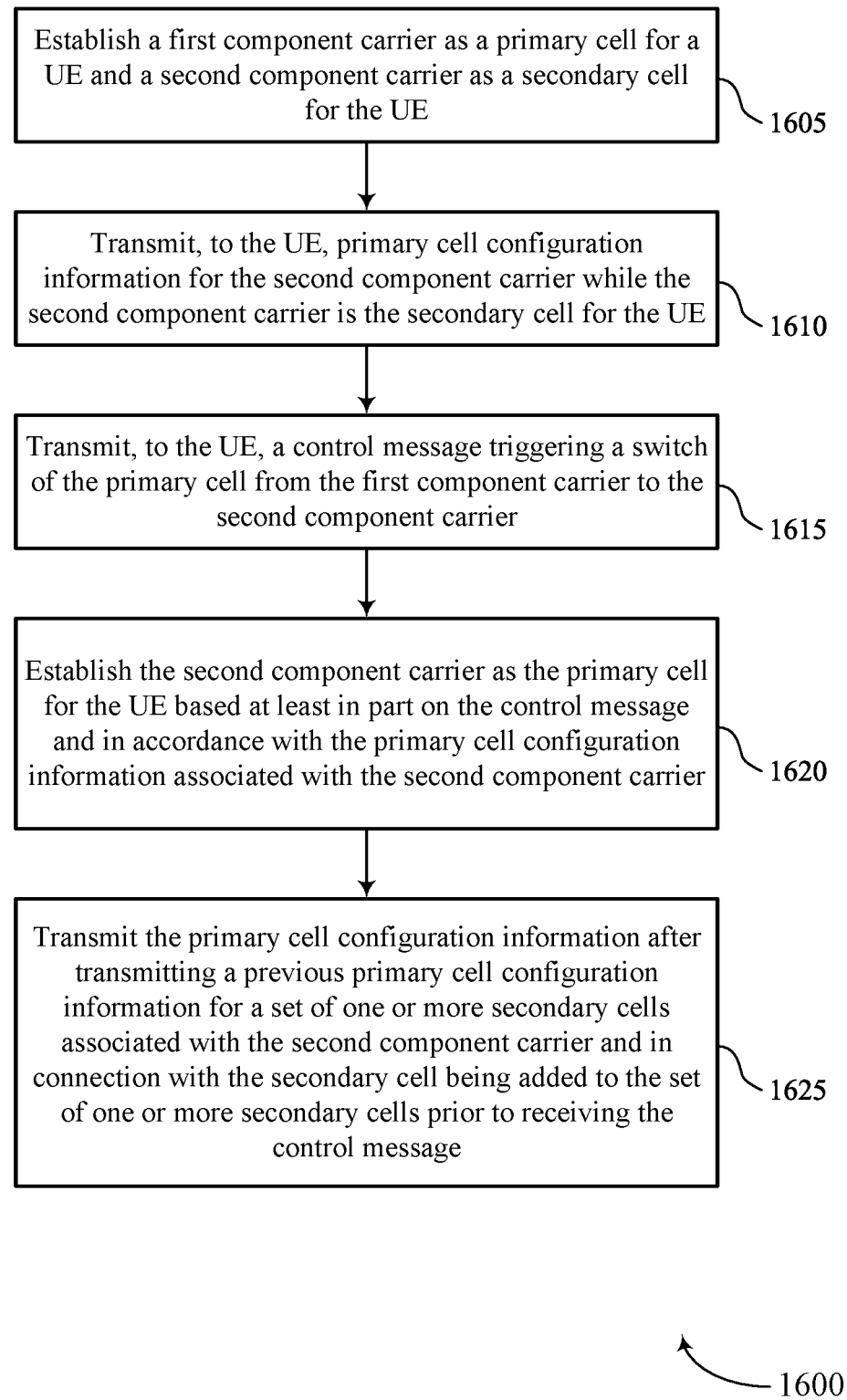

FIG. 16 shows a flowchart illustrating a method 1600 that supports fast primary cell switching in carrier aggregation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include establishing a first component carrier as a primary cell for a UE and a second component carrier as a secondary cell for the UE. The operations of 1605 may be performed in accordance with examples as disclosed herein. In some examples, aspects of the operations of 1605 may be performed by a carrier manager 1125 as described with reference to FIG. 11.

At 1610, the method may include transmitting the primary cell configuration information after transmitting a previous primary cell configuration information for a set of one or more secondary cells associated with the second component carrier and in connection with the secondary cell being added to the set of one or more secondary cells prior to receiving the control message. The operations of 1610 may be performed in accordance with examples as disclosed herein. In some examples, aspects of the operations of 1610 may be performed by a configuring manager 1130 as described with reference to FIG. 11.

At 1615, the method may include transmitting, to the UE, a control message triggering a switch of the primary cell from the first component carrier to the second component carrier. The operations of 1615 may be performed in accordance with examples as disclosed herein. In some examples, aspects of the operations of 1615 may be performed by a trigger manager 1135 as described with reference to FIG. 11.

At 1620, the method may include establishing the second component carrier as the primary cell for the UE based on the control message and in accordance with the primary cell configuration information associated with the second component carrier. The operations of 1620 may be performed in accordance with examples as disclosed herein. In some examples, aspects of the operations of 1620 may be performed by a handover manager 1140 as described with reference to FIG. 11.

The following provides an overview of aspects of the present disclosure:

Aspect 1: A method of fast primary cell switching for wireless communication at a UE, comprising: establishing a first component carrier as a primary cell for the UE and a second component carrier as a secondary cell for the UE; receiving primary cell configuration information for the second component carrier while the second component carrier is the secondary cell for the UE; receiving a control message triggering a switch of the primary cell from the first component carrier to the second component carrier; and establishing the second component carrier as the primary cell for the UE based at least in part on the control message and in accordance with the primary cell configuration information associated with the second component carrier.

Aspect 2: The method of aspect 1, further comprising: receiving the primary cell configuration information after receiving a previous primary cell configuration information for a set of one or more secondary cells associated with the second component carrier and in connection with the secondary cell being added to the set of one or more secondary cells prior to receiving the control message.

Aspect 3: The method of any of aspects 1 through 2, further comprising: receiving an update to the primary cell configuration information prior to receiving the control message; and incorporating the update into the primary cell configuration information prior to establishing the second component carrier as the primary cell for the UE.

Aspect 4: The method of any of aspects 1 through 3, further comprising: using at least a portion of a configuration associated with the first component carrier as the primary cell with the second component carrier established as the primary cell.

Aspect 5: The method of any of aspects 1 through 4, further comprising: determining, before receiving the control message, that the primary cell configuration information does not include at least a portion of a configuration for configuring the second component carrier as the primary cell; and using at least a portion of a configuration associated with the first component carrier as the primary cell to generate or modify the configuration for the second component carrier as the primary cell.

Aspect 6: The method of any of aspects 1 through 5, wherein the primary cell configuration information comprises a first primary cell configuration of a first secondary cell of the second component carrier and a second primary cell configuration of a second secondary cell of the second component carrier.

Aspect 7: The method of any of aspects 1 through 6, wherein the primary cell configuration information comprises a physical uplink control channel configuration for primary cells, a random access channel configuration for primary cells, a measurement configuration for primary cells, a radio link failure configuration for primary cells, or a radio link monitoring configuration for primary cells, or a combination thereof.

Aspect 8: The method of any of aspects 1 through 7, wherein the control message specifies the primary cell configuration information to be used with the second component carrier when the second component carrier is established as the primary cell.

Aspect 9: The method of any of aspects 1 through 8, wherein the control message comprises a downlink control information message, the downlink control information message comprising a field dedicated to indicating one or more of: that the second component carrier is selected to be established as the primary cell, that the first component carrier is selected to be established as the secondary cell, or whether the first component carrier is selected for deactivation, or any combination thereof.

Aspect 10: The method of any of aspects 1 through 9, wherein the control message includes an indicator indicating whether the first component carrier is selected for deactivation.

Aspect 11: The method of any of aspects 1 through 10, wherein the control message comprises a media access control message, a header of the media access control message indicating one or more of: that the second component carrier is selected to be established as the primary cell, that the first component carrier is selected to be established as the secondary cell, or whether the first component carrier is selected for deactivation, or any combination thereof.

Aspect 12: The method of any of aspects 1 through 11, wherein the control message comprises a radio resource control message indicating one or more of: that the second component carrier is selected to be established as the primary cell, that the first component carrier is selected to be established as the secondary cell, or whether the first component carrier is selected for deactivation, or any combination thereof.

Aspect 13: The method of any of aspects 1 through 12, further comprising: transmitting a completion message based at least in part on establishing the second component carrier as the primary cell, wherein the completion message is transmitted via the second component carrier as the primary cell or the first component carrier as the secondary cell.

Aspect 14: The method of aspect 13, wherein the completion message is transmitted in a dedicated field of uplink control information via a physical uplink control channel or a physical uplink shared channel.

Aspect 15: The method of any of aspects 13 through 14, wherein the completion message is transmitted via a hybrid automatic repeat request acknowledgment.

Aspect 16: The method of any of aspects 1 through 15, wherein the fast primary cell switching is based at least in part on the first component carrier and the second component carrier being in a same timing advance group.

Aspect 17: The method of any of aspects 1 through 16, wherein the fast primary cell switching is based at least in part on the first component carrier and the second component carrier being associated with a same base station.

Aspect 18: The method of any of aspects 1 through 17, further comprising: receiving a second control message triggering a switch of the primary cell from the second component carrier back to the first component carrier; and reestablishing the first component carrier as the primary cell for the UE and the second component carrier as the secondary cell for the UE based at least in part on the second control message.

Aspect 19: The method of aspect 18, further comprising: wherein the control message is received based at least in part on a first network condition or the second control message is received based at least in part on a second network condition, or both, and wherein the first network condition or the second network condition is, or both are, based at least in part on a network load associated with the first component carrier or a network load associated with the second component carrier, or a network load associated with the first component carrier and the second component carrier.

Aspect 20: A method of fast primary cell switching for wireless communication at a base station, further comprising: establishing a first component carrier as a primary cell for a UE and a second component carrier as a secondary cell for the UE; transmitting, to the UE, primary cell configuration information for the second component carrier while the second component carrier is the secondary cell for the UE; transmitting, to the UE, a control message triggering a switch of the primary cell from the first component carrier to the second component carrier; and establishing the second component carrier as the primary cell for the UE based at least in part on the control message and in accordance with the primary cell configuration information associated with the second component carrier.

Aspect 21: The method of aspect 20, further comprising: transmitting the primary cell configuration information after transmitting a previous primary cell configuration information for a set of one or more secondary cells associated with the second component carrier and in connection with the secondary cell being added to the set of one or more secondary cells prior to receiving the control message.

Aspect 22: The method of any of aspects 20 through 21, further comprising: transmitting an update to the primary cell configuration information prior to receiving the control message.

Aspect 23: The method of any of aspects 20 through 22, wherein the primary cell configuration information comprises a first primary cell configuration of a first secondary cell of the second component carrier and a second primary cell configuration of a second secondary cell of the second component carrier.

Aspect 24: The method of any of aspects 20 through 23, wherein the primary cell configuration information comprises a physical uplink control channel configuration for primary cells, a random access channel configuration for primary cells, a measurement configuration for primary cells, a radio link failure configuration for primary cells, or a radio link monitoring configuration for primary cells, or a combination thereof.

Aspect 25: The method of any of aspects 20 through 24, wherein the control message specifies the primary cell configuration information to be used with the second component carrier when the second component carrier is established as the primary cell.

Aspect 26: The method of any of aspects 20 through 25, wherein the control message comprises a downlink control information message, the downlink control information message comprising a field dedicated to indicating one or more of: that the second component carrier is selected to be established as the primary cell, that the first component carrier is selected to be established as the secondary cell, or whether the first component carrier is selected for deactivation, or any combination thereof.

Aspect 27: The method of any of aspects 20 through 26, wherein the control message includes an indicator indicating whether the first component carrier is selected for deactivation.

Aspect 28: The method of any of aspects 20 through 27, wherein the control message comprises a media access control message, a header of the media access control message indicating one or more of: that the second component carrier is selected to be established as the primary cell, that the first component carrier is selected to be established as the secondary cell, or whether the first component carrier is selected for deactivation, or any combination thereof.

Aspect 29: The method of any of aspects 20 through 28, wherein the control message comprises a radio resource control message indicating one or more of: that the second component carrier is selected to be established as the primary cell, that the first component carrier is selected to be established as the secondary cell, or whether the first component carrier is selected for deactivation, or any combination thereof.

Aspect 30: The method of any of aspects 20 through 29, further comprising: receiving a completion message based at least in part on establishing the second component carrier as the primary cell, wherein the completion message is received via the second component carrier as the primary cell or the first component carrier as the secondary cell.

Aspect 31: The method of aspect 30, wherein the completion message is received in a dedicated field of uplink control information via a physical uplink control channel or a physical uplink shared channel.

Aspect 32: The method of any of aspects 30 through 31, wherein the completion message is received via a hybrid automatic repeat request acknowledgment.

Aspect 33: The method of any of aspects 20 through 32, wherein the fast primary cell switching is based at least in part on the first component carrier and the second component carrier being in a same timing advance group.

Aspect 34: The method of any of aspects 20 through 33, wherein the fast primary cell switching is based at least in part on the first component carrier and the second component carrier being associated with the base station.

Aspect 35: The method of any of aspects 20 through 34, further comprising: maintaining, based at least in part on the control message, a second primary cell on the second component carrier and a second secondary cell on the first component carrier, the primary cell and the secondary cell associated with a first group of UEs comprising the UE, and the second primary cell and second secondary cell associated with a second group of UEs different from the first group of UEs.

Aspect 36: The method of aspect 35, further comprising: deactivating the first component carrier based at least in part on the control message.

Aspect 37: The method of any of aspects 20 through 36, further comprising: transmitting, to the UE, a second control message triggering a switch of the primary cell from the second component carrier back to the first component carrier; and reestablishing the first component carrier as the primary cell for the UE and the second component carrier as the secondary cell for the UE based at least in part on the second control message.

Aspect 38: The method of aspect 37, further comprising: wherein the control message is transmitted based at least in part on a first network condition or the second control message is transmitted based at least in part on a second network condition, or both, and wherein the first network condition or the second network condition is, or both are, based at least in part on a network load associated with the first component carrier or a network load associated with the second component carrier, or a network load associated with the first component carrier and the second component carrier.

Aspect 39: An apparatus comprising a processor; memory coupled with the processor; and instructions stored in the memory and executable by the processor to cause the apparatus to perform a method of any of aspects 1 through 19.

Aspect 40: An apparatus comprising at least one means for performing a method of any of aspects 1 through 19.

Aspect 41: A non-transitory computer-readable medium storing code the code comprising instructions executable by a processor to perform a method of any of aspects 1 through 19.

Aspect 42: An apparatus comprising a processor; memory coupled with the processor; and instructions stored in the memory and executable by the processor to cause the apparatus to perform a method of any of aspects 20 through 38.

Aspect 43: An apparatus comprising at least one means for performing a method of any of aspects 20 through 38.

Aspect 44: A non-transitory computer-readable medium storing code the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories; and
one or more processors coupled to the one or more memories and configured to:
establish a first component carrier as a primary cell for the UE and a second component carrier as a secondary cell for the UE, wherein the first component carrier and the second component carrier are in a same timing advance group;
receive primary cell configuration information for the second component carrier while the second component carrier is the secondary cell for the UE;
receive a control message triggering a switch of the primary cell from the first component carrier to the second component carrier;
establish the second component carrier as the primary cell for the UE based at least in part on the control message and in accordance with the primary cell configuration information associated with the second component carrier; and
transmit, based at least in part on establishing the second component carrier as the primary cell, a completion message included in a dedicated field of one or more uplink messages.

2. The UE of claim 1, wherein the one or more processors are further configured to:
receive the primary cell configuration information after receiving a previous primary cell configuration information for a set of one or more secondary cells associated with the second component carrier and in connection with the secondary cell being added to the set of one or more secondary cells prior to receiving the control message.

3. The UE of claim 1, wherein the one or more processors are further configured to:
receive an update to the primary cell configuration information prior to receiving the control message; and
incorporate the update into the primary cell configuration information prior to establishing the second component carrier as the primary cell for the UE.

4. The UE of claim 1, wherein the one or more processors are further configured to:
use at least a portion of a configuration associated with the first component carrier as the primary cell with the second component carrier established as the primary cell.

5. The UE of claim 1, wherein the one or more processors are further configured to:
determine, before receiving the control message, that the primary cell configuration information does not include at least a portion of a configuration for configuring the second component carrier as the primary cell; and
use at least a portion of a configuration associated with the first component carrier as the primary cell to generate or modify the configuration for the second component carrier as the primary cell.

6. The UE of claim 1, wherein the primary cell configuration information comprises a first primary cell configuration of a first secondary cell of the second component carrier and a second primary cell configuration of a second secondary cell of the second component carrier.

7. The UE of claim 1, wherein the primary cell configuration information comprises a physical uplink control channel configuration for primary cells, a random access channel configuration for primary cells, a measurement configuration for primary cells, a radio link failure configuration for primary cells, or a radio link monitoring configuration for primary cells, or a combination thereof.

8. The UE of claim 1, wherein the control message specifies the primary cell configuration information to be used with the second component carrier when the second component carrier is established as the primary cell.

9. The UE of claim 1, wherein the control message comprises a downlink control information message, the downlink control information message comprising a field dedicated to indicating one or more of: that the second component carrier is selected to be established as the primary cell, that the first component carrier is selected to be established as the secondary cell, or whether the first component carrier is selected for deactivation, or any combination thereof.

10. The UE of claim 1, wherein the control message indicates whether the first component carrier is selected for deactivation.

11. The UE of claim 1, wherein the control message comprises a media access control message, a header of the media access control message indicating one or more of: that the second component carrier is selected to be established as the primary cell, that the first component carrier is selected to be established as the secondary cell, or whether the first component carrier is selected for deactivation, or any combination thereof.

12. The UE of claim 1, wherein the control message comprises a radio resource control message indicating one or more of: that the second component carrier is selected to be established as the primary cell, that the first component carrier is selected to be established as the secondary cell, or whether the first component carrier is selected for deactivation, or any combination thereof.

13. The UE of claim 1, wherein, to transmit the completion message, the one or more processors are further configured to:
transmit the completion message via the second component carrier as the primary cell or the first component carrier as the secondary cell.

14. The UE of claim 13, the dedicated field is included in uplink control information via a physical uplink control channel or a physical uplink shared channel.

15. The UE of claim 13, wherein the completion message is transmitted via a hybrid automatic repeat request acknowledgment.

16. The UE of claim 1, wherein establishing the second component carrier as the primary cell is based at least in part on the first component carrier and the second component carrier being in the same timing advance group.

17. The UE of claim 1, wherein establishing the second component carrier as the primary cell is based at least in part on the first component carrier and the second component carrier being associated with a same network device.

18. The UE of claim 1, wherein the one or more processors are further configured to:
receive a second control message triggering a switch of the primary cell from the second component carrier back to the first component carrier; and
reestablish the first component carrier as the primary cell for the UE and the second component carrier as the secondary cell for the UE based at least in part on the second control message.

19. The UE of claim 18, wherein:
the control message is received based at least in part on a first network condition or the second control message is received based at least in part on a second network condition, or both; and
the first network condition or the second network condition is, or both are, based at least in part on a network load associated with the first component carrier or a network load associated with the second component carrier, or a network load associated with the first component carrier and the second component carrier.

20. A network device, comprising:
one or more memories; and
one or more processors coupled to the one or more memories and configured to:
establish a first component carrier as a primary cell for a user equipment (UE) and a second component carrier as a secondary cell for the UE, wherein the first component carrier and the second component carrier are in a same timing advance group;
transmit, to the UE, primary cell configuration information for the second component carrier while the second component carrier is the secondary cell for the UE;
transmit, to the UE, a control message triggering a switch of the primary cell from the first component carrier to the second component carrier;
establish the second component carrier as the primary cell for the UE based at least in part on the control message and in accordance with the primary cell configuration information associated with the second component carrier; and
receive, based at least in part on establishing the second component carrier as the primary cell, a completion message included in a dedicated field of one or more uplink messages.

21. The network device of claim 20, wherein the one or more processors are further configured to:
transmit the primary cell configuration information after transmitting a previous primary cell configuration information for a set of one or more secondary cells associated with the second component carrier and in connection with the secondary cell being added to the set of one or more secondary cells prior to receiving the control message.

22. The network device of claim 20, wherein the one or more processors are further configured to:
transmit an update to the primary cell configuration information prior to receiving the control message.

23. The network device of claim 20, wherein the primary cell configuration information comprises a first primary cell configuration of a first secondary cell of the second component carrier and a second primary cell configuration of a second secondary cell of the second component carrier.

24. The network device of claim 20, wherein the primary cell configuration information comprises a physical uplink control channel configuration for primary cells, a random access channel configuration for primary cells, a measurement configuration for primary cells, a radio link failure configuration for primary cells, or a radio link monitoring configuration for primary cells, or a combination thereof.

25. The network device of claim 20, wherein the control message specifies the primary cell configuration information to be used with the second component carrier when the second component carrier is established as the primary cell.

26. The network device of claim 20, wherein the control message comprises a downlink control information message, the downlink control information message comprising a field dedicated to indicating one or more of: that the second component carrier is selected to be established as the primary cell, that the first component carrier is selected to be established as the secondary cell, or whether the first component carrier is selected for deactivation, or any combination thereof.

27. The network device of claim 20, wherein the control message includes an indicator indicating whether the first component carrier is selected for deactivation.

28. The network device of claim 20, wherein the control message comprises a media access control message, a header of the media access control message indicating one or more of: that the second component carrier is selected to be established as the primary cell, that the first component carrier is selected to be established as the secondary cell, or whether the first component carrier is selected for deactivation, or any combination thereof.

29. A method of fast primary cell switching for wireless communication at a user equipment (UE), comprising:

establishing a first component carrier as a primary cell for the UE and a second component carrier as a secondary cell for the UE, wherein the first component carrier and the second component carrier are in a same timing advance group;

receiving primary cell configuration information for the second component carrier while the second component carrier is the secondary cell for the UE;

receiving a control message triggering a switch of the primary cell from the first component carrier to the second component carrier;

establishing the second component carrier as the primary cell for the UE based at least in part on the control message and in accordance with the primary cell configuration information associated with the second component carrier; and transmitting, based at least in part on establishing the second component carrier as the primary cell, a completion message included in a dedicated field of one or more uplink messages.

30. A method of fast primary cell switching for wireless communication at a network device, further comprising:

establishing a first component carrier as a primary cell for a user equipment (UE) and a second component carrier as a secondary cell for the UE, wherein the first component carrier and the second component carrier are in a same timing advance group;

transmitting, to the UE, primary cell configuration information for the second component carrier while the second component carrier is the secondary cell for the UE;

transmitting, to the UE, a control message triggering a switch of the primary cell from the first component carrier to the second component carrier;

establishing the second component carrier as the primary cell for the UE based at least in part on the control message and in accordance with the primary cell configuration information associated with the second component carrier; and receiving, based at least in part on establishing the second component carrier as the primary cell, a completion message included in a dedicated field of one or more uplink messages.

* * * * *